United States Patent
Mikawa

(10) Patent No.: US 8,620,112 B2
(45) Date of Patent: Dec. 31, 2013

(54) IMAGE MANAGEMENT APPARATUS AND IMAGE MANAGEMENT METHOD SEARCHING FOR A DEVELOPMENT UNIT TO PERFORM A DEVELOPMENT PROCESS PARAMETER SET ON A RAW IMAGE DATA

(75) Inventor: Chiaki Mikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 12/712,074

(22) Filed: Feb. 24, 2010

(65) Prior Publication Data

US 2010/0226594 A1   Sep. 9, 2010

(30) Foreign Application Priority Data

Mar. 5, 2009   (JP) ................................. 2009-052553

(51) Int. Cl.
*G06K 9/03*   (2006.01)
(52) U.S. Cl.
USPC ....................................... 382/309; 348/222.1
(58) Field of Classification Search
USPC ....................................... 382/309; 348/222.1
See application file for complete search history.

(56) References Cited

U.S. PATENT DOCUMENTS

| 6,038,373 | A * | 3/2000 | Matsumoto et al. ............ 358/1.9 |
| 6,563,952 | B1 * | 5/2003 | Srivastava et al. ............. 382/225 |
| 6,567,119 | B1 * | 5/2003 | Parulski et al. ............. 348/207.2 |
| 6,614,873 | B1 * | 9/2003 | Taylor et al. .................... 378/62 |
| 6,980,233 | B1 * | 12/2005 | Hirasawa .................... 348/207.1 |
| 7,259,786 | B2 * | 8/2007 | Shimizu ....................... 348/231.6 |
| 7,356,204 | B2 * | 4/2008 | Takahashi ...................... 382/309 |
| 7,424,171 | B2 * | 9/2008 | Matsuzaka .................... 382/275 |
| 7,545,529 | B2 * | 6/2009 | Borrey et al. ................. 358/1.15 |
| 7,742,080 | B2 * | 6/2010 | Nakajima .................... 348/222.1 |
| 7,809,186 | B2 * | 10/2010 | Takahashi ...................... 382/162 |
| 7,834,924 | B2 * | 11/2010 | Uehara et al. ............. 348/333.02 |
| 7,920,739 | B2 * | 4/2011 | Chien et al. .................... 382/162 |
| 7,974,468 | B2 * | 7/2011 | Kojima et al. ................. 382/167 |
| 8,125,533 | B2 * | 2/2012 | Shiohara .................... 348/222.1 |
| 8,355,070 | B2 * | 1/2013 | Shiohara .................... 348/333.12 |
| 8,369,654 | B2 * | 2/2013 | Shiohara ........................ 382/300 |
| 2001/0002142 | A1 * | 5/2001 | Akiyama et al. .............. 348/222 |
| 2003/0030729 | A1 * | 2/2003 | Prentice et al. ............ 348/220.1 |
| 2003/0179297 | A1 * | 9/2003 | Parulski et al. ............ 348/207.2 |

(Continued)

FOREIGN PATENT DOCUMENTS

| JP | 2002-330388 A | 11/2002 |
| JP | 2004-165797 A | 6/2004 |

(Continued)

OTHER PUBLICATIONS

Japanese Office Action dated Mar. 25, 2013, in counterpart Japanese Application No. 2009-052553.

*Primary Examiner* — Gandhi Thirugnanam
(74) *Attorney, Agent, or Firm* — Fitzpatrick, Cella, Harper & Scinto

(57) ABSTRACT

A RAW image, a parameter set used in a development process for the RAW image data, and attribute information of the parameter set are obtained, and a development processing apparatus (or development processing software) to be used for development of the RAW image is determined. The attribute information of the parameter set includes information which identifies a development processing apparatus (or development processing software) that performed development. Based on this information, an apparatus or software which is to perform a development process is searched for. The RAW image and development process parameters are transmitted to the detected development processing apparatus or software.

28 Claims, 20 Drawing Sheets

(56) References Cited

U.S. PATENT DOCUMENTS

| | | | |
|---|---|---|---|
| 2003/0184650 A1* | 10/2003 | Brown et al. | 348/207.1 |
| 2004/0119841 A1* | 6/2004 | Shimizu | 348/222.1 |
| 2004/0196381 A1* | 10/2004 | Matsuzaka | 348/222.1 |
| 2005/0163391 A1* | 7/2005 | Ishida | 382/254 |
| 2005/0174449 A1* | 8/2005 | Matsuzaka | 348/240.3 |
| 2005/0174590 A1* | 8/2005 | Kubo | 358/1.9 |
| 2005/0198067 A1* | 9/2005 | Liu | 707/104.1 |
| 2005/0212914 A1* | 9/2005 | Seto et al. | 348/207.1 |
| 2005/0219580 A1* | 10/2005 | Ozawa | 358/1.9 |
| 2006/0055785 A1* | 3/2006 | Nagajima | 348/207.99 |
| 2006/0152609 A1* | 7/2006 | Prentice et al. | 348/272 |
| 2006/0238623 A1* | 10/2006 | Ogawa | 348/220.1 |
| 2007/0052819 A1* | 3/2007 | Nakao et al. | 348/231.1 |
| 2007/0098261 A1* | 5/2007 | Kojima et al. | 382/167 |
| 2008/0089580 A1* | 4/2008 | Marcu | 382/162 |
| 2008/0159656 A1* | 7/2008 | Takahashi | 382/309 |
| 2008/0218605 A1* | 9/2008 | Matsuzaka | 348/240.3 |
| 2008/0226199 A1* | 9/2008 | Breglio | 382/311 |
| 2008/0278599 A1* | 11/2008 | Shiohara | 348/222.1 |
| 2008/0279468 A1* | 11/2008 | Shiohara | 382/254 |
| 2009/0066730 A1* | 3/2009 | Mikawa | 345/661 |
| 2009/0290042 A1* | 11/2009 | Shiohara | 348/222.1 |
| 2010/0226594 A1* | 9/2010 | Mikawa | 382/309 |
| 2012/0086835 A1* | 4/2012 | Matsuzaka | 348/240.99 |
| 2012/0236176 A1* | 9/2012 | Kita | 348/231.2 |
| 2012/0274833 A1* | 11/2012 | Shiohara | 348/333.12 |
| 2012/0308156 A1* | 12/2012 | Yamazaki | 382/284 |

FOREIGN PATENT DOCUMENTS

| | | | | |
|---|---|---|---|---|
| JP | 2004304712 A | * | 10/2004 | H04N 9/804 |
| JP | 2006-203572 A | | 8/2006 | |
| JP | 2006-253957 A | | 9/2006 | |
| JP | 2006-303676 A | | 11/2006 | |
| JP | 2007060153 A | | 3/2007 | |
| JP | 2007088515 A | | 4/2007 | |
| JP | 2007-142551 A | | 6/2007 | |
| JP | 2008-11413 A | | 1/2008 | |
| JP | 2009-159224 A | | 7/2009 | |

* cited by examiner

FIG. 12

| ID | ACCESS METHOD | NAME OF DEVELOPMENT PROCESSING SOFTWARE | STATUS | COMPATIBLE MODEL | WAIT TIME | DEVELOPMENT PROCESS TIME | COMMUNICATION TIME |
|---|---|---|---|---|---|---|---|
| 001 | http://server.co.jp/service/App_001 | Application BBB for Server | READY TO COMMUNICATE WAITING | CameraA CameraB | 0sec | 1sec | 10sec |
| 002 | http://server.co.jp/service/App_002 | Application CCC for Server | READY TO COMMUNICATE BUSY | CameraC | 7sec | 5sec | 10sec |
| 007 | C:\WINNT\twain\_32\Camera | Application DDD for Camera | READY TO COMMUNICATE WAITING | CameraD | 0sec | 2sec | 14sec |
| 009 | C:\Program Files\App\App_009.exe | Application AAA for Local PC | READY TO COMMUNICATE WAITING | CameraA CameraB | 0sec | 3sec | 0sec |

FIG. 13

| ID | ACCESS METHOD | NAME OF DEVELOPMENT PROCESSING SOFTWARE |
|---|---|---|
| 001 | http://server.co.jp/service/App_001 | Application BBB for Server |
| 002 | http://server.co.jp/service/App_002 | Application CCC for Server |
| 007 | C:\WINNT\twain\_32\Camera | Application DDD for Camera |
| 009 | C:\Program Files\App\App_009.exe | Application AAA for Local PC |

FIG. 14

WARNING

FOLLOWING DEVELOPMENT PROCESSING SOFTWARE IS ASSOCIATED WITH DEVELOPMENT PROCESS PARAMETERS.
HOWEVER, THE DEVELOPMENT PROCESSING SOFTWARE IS NOT FOUND NOW.
CONNECT TO NETWORK AND INSTALL LATEST DEVELOPMENT PROCESSING SOFTWARE,
OR USE ON-LINE DEVELOPMENT PROCESSING SERVICE.

Application AAA for Local PC

OK

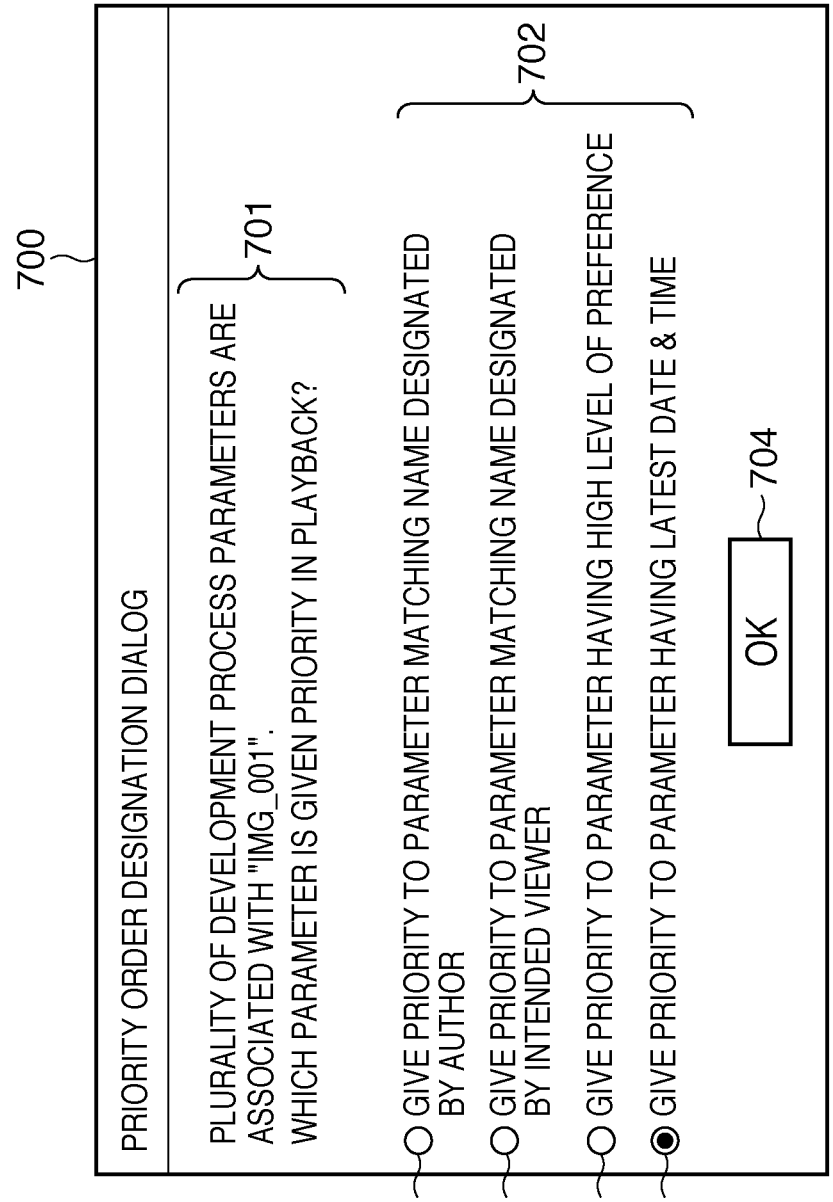

FIG. 18

AUTHOR NAME ENTRY DIALOG

ENTER AUTHOR NAME

Author : [           ]

INTENDED VIEWER NAME ENTRY DIALOG

ENTER INTENDED VIEWER NAME

Viewer : [           ]

[ OK ]

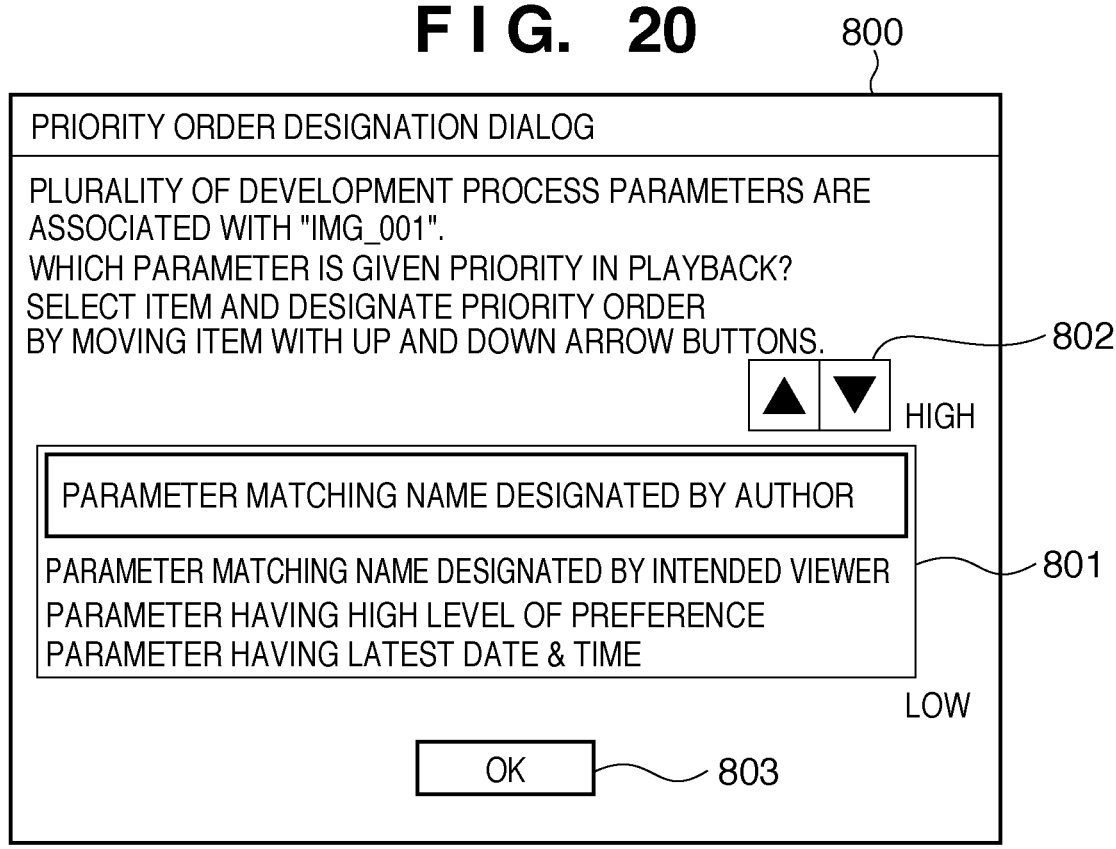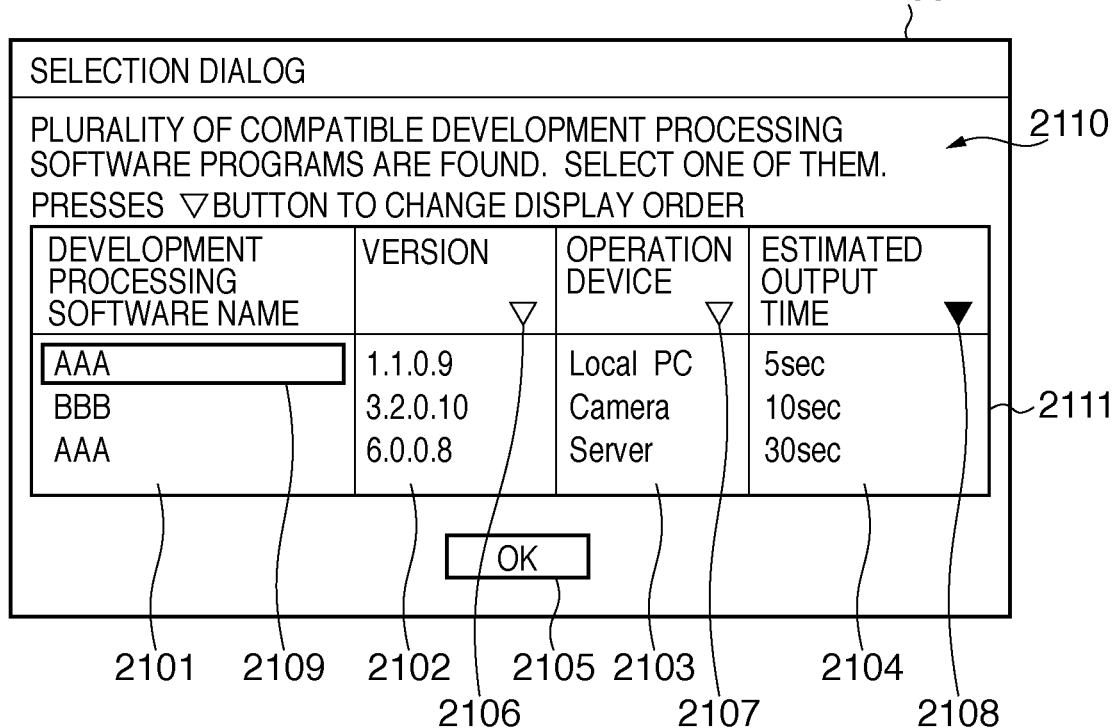

IMAGE MANAGEMENT APPARATUS AND IMAGE MANAGEMENT METHOD SEARCHING FOR A DEVELOPMENT UNIT TO PERFORM A DEVELOPMENT PROCESS PARAMETER SET ON A RAW IMAGE DATA

BACKGROUND OF THE INVENTION

1. Field of the Invention

The present invention relates to an image management apparatus and image management method for managing image data.

2. Description of the Related Art

These days, a growing number of image capturing apparatuses such as digital still cameras have a function to record image information output from an image sensor such as a CCD image sensor directly as a RAW image on a recording medium. The RAW image can be displayed as, for example, a full-color image after a so-called "development" process.

In general, the development process is done nondestructively for a RAW image using the image processing function of an external image processing apparatus or an image capturing apparatus. The external image processing apparatus is often a personal computer on which image processing software runs. A parameter set (development parameters) used in the development process can be stored in a RAW image file together with RAW image data. The user can repetitively generate developed image data from a RAW image independently of another image process without degrading the image quality.

When adjusting the image quality such as the lightness and contrast of an image based on a RAW image, the user selects development process parameters and adjusts their values such as lightness ±0 and contrast +2 by using the above-mentioned image processing apparatus. The RAW image undergoes a development process based on the adjusted parameters. Recently, image processing apparatuses (image processing software programs) capable of developing a RAW image are growing diverse. In this situation, the user generally selects an image processing apparatus he wants and performs a development process for a RAW image.

For example, Japanese Patent Laid-Open No. 2007-60153 discloses an apparatus that improves the convenience of an image process by associating the process history of an image process executed for a RAW image at a plurality of stages with an image during the process so that the processed image can be restored to a state before the process. Japanese Patent Laid-Open No. 2007-88515 also discloses an apparatus which allows a user to select different development process parameters to be applied between a case in which a plurality of RAW images undergo a development process at once and a case in which one RAW image undergoes a development process.

A case will be examined, in which a user (called an author) executes image quality adjustment as described above for a RAW image, stores development parameters used for the adjustment together with the RAW image data, and passes the file to another user (called an intended viewer). As described above, various kinds of development processing software are available lately, so the intended viewer does not always use the same development processing software as that used by the author to adjust the image quality of a RAW image. The intended viewer may perform a development process for a RAW image in a file received from the author by using development processing software different from that used by the author.

In this case, the intended viewer who is carrying out the development process may ignore development parameters used by the author to adjust the image quality of the RAW image. As a result, it becomes difficult to play back the RAW image on the intended viewer side appropriately as intended by the author.

SUMMARY OF THE INVENTION

The present invention has been made to overcome the conventional drawbacks, and has as its object to provide an image management apparatus and image management method capable of playing back a RAW image by properly reflecting a development process performed for the RAW image by its author.

According to an aspect of the present invention, there is provided an image management apparatus comprising: an obtaining unit configured to obtain RAW image data and attribute information on a development process for the RAW image data, the attribute information including a parameter set used in the development process performed for the RAW image data, and information capable of identifying a developing unit which performed the development process using the parameter set of the development process; a search unit configured to search, based on the information which is contained in the attribute information and can identify a developing unit, for a developing unit which is to perform a development process for the RAW image data; and a notifying unit configured to notify the developing unit detected by the search unit of the parameter set and the RAW image data.

According to another aspect of the present invention, there is provided an image management method for causing a computer to execute an obtaining step of obtaining RAW image data and attribute information on a development process for the RAW image data, the attribute information including a parameter set used in a development process performed for the RAW image data, and information capable of identifying a developing unit which performed the development process using the parameter set, a search step of searching, based on the information which is contained in the attribute information and can identify developing unit, for developing unit which is to perform a development process for the RAW image data, and a notifying step of notifying the developing unit detected in the search step of the parameter set and the RAW image data.

Further features of the present invention will become apparent from the following description of exemplary embodiments with reference to the attached drawings.

BRIEF DESCRIPTION OF THE DRAWINGS

FIG. 12 is a table exemplifying the structure of a development processing software list;

FIG. 13 is a table exemplifying another structure of the development processing software list;

FIG. 14 is a view exemplifying a warning display indicating that no development processing software has been detected;

FIG. 17 is a view exemplifying the dialog box of a user interface to designate the priority order of development process parameters;

FIG. 18 is a view exemplifying a dialog box to enter an author name;

FIG. 19 is a view exemplifying a dialog box to enter an intended viewer name;

FIG. 20 is a view exemplifying a dialog box to designate priority levels sequentially for a plurality of conditions; and FIG. 21 is a view exemplifying a dialog box which forms a user interface according to the second modification to the embodiment of the present invention.

DESCRIPTION OF THE EMBODIMENTS

Preferred embodiments of the present invention will now be described in detail in accordance with the accompanying drawings.

An image management apparatus according to the present invention manages RAW image data obtained by an image capturing apparatus, such as a digital still camera or digital video camera, which captures an image by converting an optical image into electrical image data using a solid-state image sensor. An image processing apparatus is selected to be able to appropriately perform a development process for the RAW image data in accordance with development process parameters associated with the RAW image data.

Figure 1:
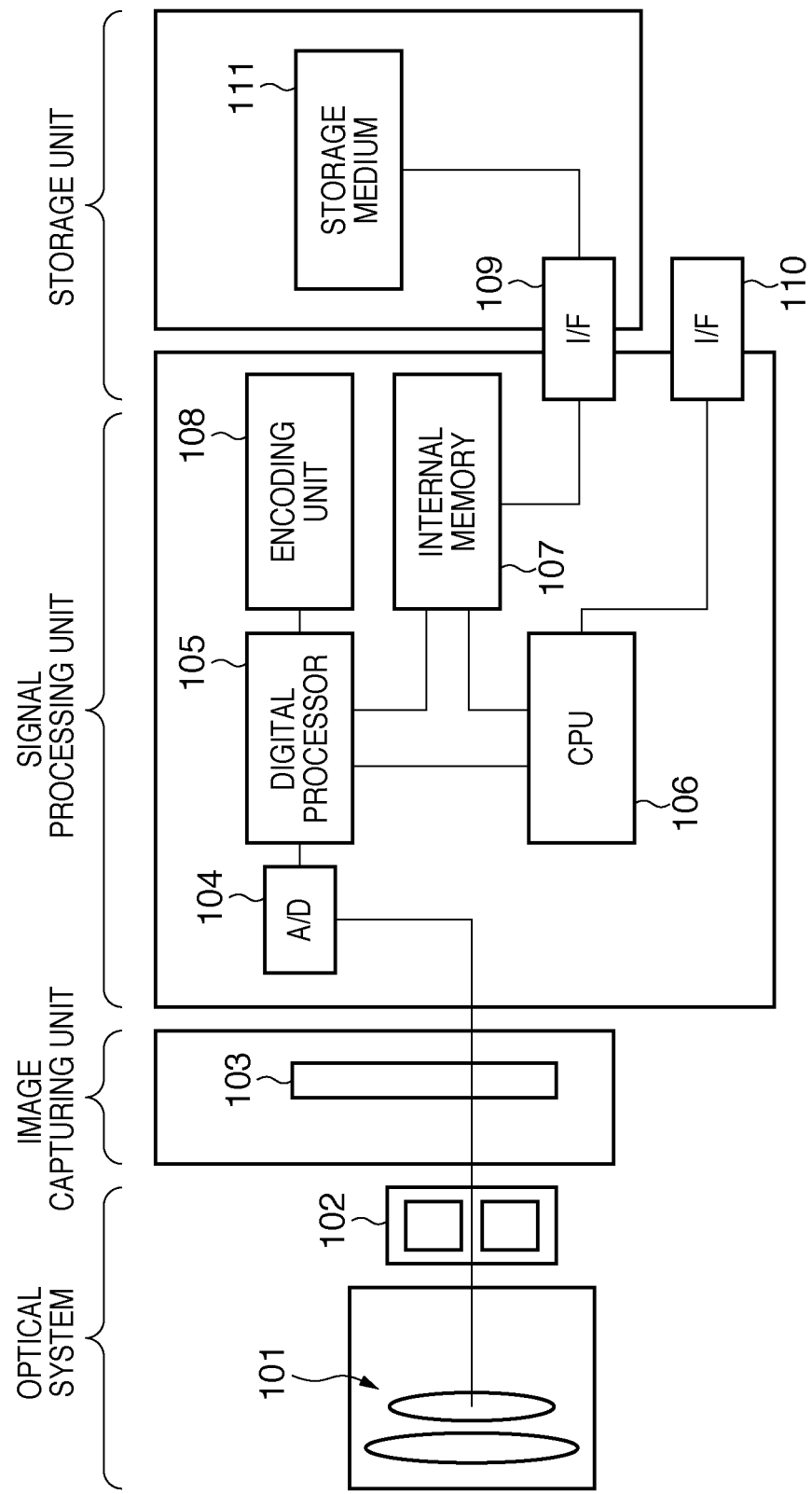
FIG. 1 is a block diagram exemplifying the arrangement of a digital still camera serving as an image input apparatus applicable to an embodiment of the present invention.

FIG. 1 exemplifies the arrangement of a digital still camera 100 serving as an image input apparatus which generates RAW image data to be managed by the image management apparatus according to the embodiment of the present invention. In the example of FIG. 1, the digital still camera 100 comprises an optical system, image capturing unit, and signal processing unit.

The optical system includes a photographing lens 101 and a shutter & stop 102. The image capturing unit includes a solid-state image sensor 103 such as a CCD image sensor or CMOS image sensor. The image capturing unit converts light traveling from an object via the optical system into an electrical signal, and outputs the electrical signal as an image capturing signal. The image capturing signal output from the image capturing unit enters the signal processing unit.

The signal processing unit includes an A/D converter 104, digital processor 105, CPU 106, internal memory 107, and compression encoding unit 108. The A/D converter 104 converts the image capturing signal output from the image capturing unit into a digital signal. The digital processor 105 executes a predetermined process for the digital signal. The compression encoding unit 108 compression-encodes the digital signal which has been processed by the digital processor 105 and is to be recorded.

The internal memory 107 includes a read only memory (ROM) and random access memory (RAM). The ROM stores control programs in advance, and the RAM is used as a temporary memory for a process by the CPU 106. The CPU 106 controls the respective units of the digital still camera 100 and executes signal processes in accordance with a control program stored in the ROM. An interface (I/F) 110 is used to communicate with an external information processing apparatus such as a personal computer.

The storage unit is formed from, for example, a storage medium 111 detachable from the housing of the digital still camera 100. The storage medium 111 is connected to the digital still camera 100 via an interface (I/F) 109. The storage medium 111 and CPU 106 exchange data via the internal memory 107.

Figure 2:
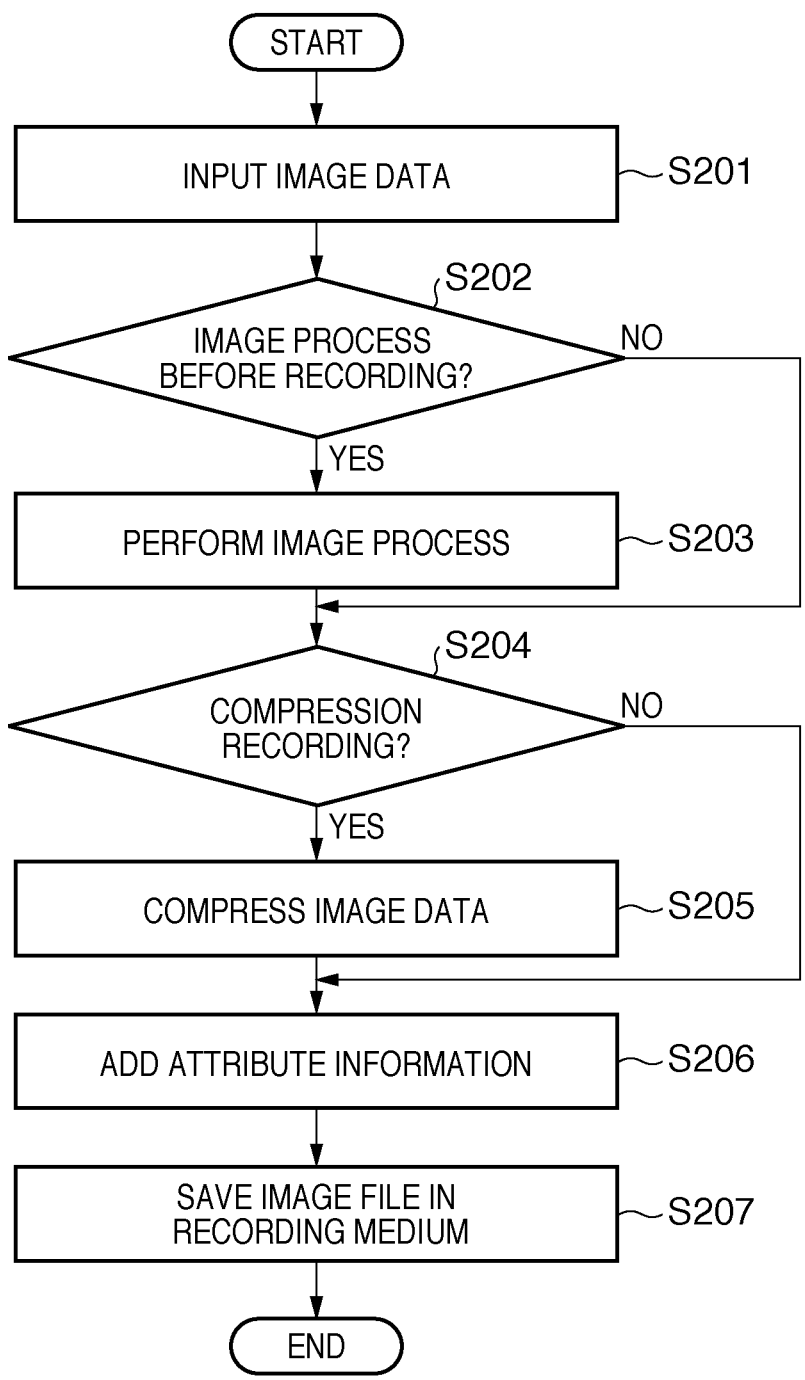
FIG. 2 is a flowchart exemplifying an image data process in the digital still camera applicable to the embodiment of the present invention.

FIG. 2 is a flowchart exemplifying an image data process in the digital still camera 100. The CPU 106 executes the process exemplified by the flowchart of FIG. 2 based on a control program stored in the internal memory 107.

The A/D converter 104 converts, into a digital signal, an image capturing signal output from the solid-state image sensor 103 in the image capturing unit. Image data obtained by converting the image capturing signal into the digital signal is input to the internal memory 107 via the digital processor 105 and stored in it (S201). At this stage, the digital processor 105 does not perform any signal process for the supplied image data.

In S202, it is determined whether to perform a predetermined image process for the image data stored in the internal memory 107 before recording the image data on the storage medium 111. This determination is made based on whether, in shooting with the digital still camera 100, the user has selected a mode (called a RAW image output mode) in which data output from the solid-state image sensor 103 is recorded without any process. If the user has selected the RAW image output mode, it is determined to record the image data without performing a predetermined image process. If the user has not selected the RAW image output mode, it is determined to perform a predetermined image process before recording the image data.

If it is determined in S202 to record the image data without performing a predetermined image process, the process shifts to S204. If it is determined to perform a predetermined image process before recording, the process shifts to S203.

In S203, the digital processor 105 performs a predetermined image process for the image data stored in the internal memory 107. For example, the digital processor 105 executes, as the predetermined image process, a filter process and a color adjustment process based on information such as white balance and auto focus. The internal memory 107 stores the processed image data. After executing the image process, the process shifts to S204.

In S204, it is determined whether to compression-encode the image data before recording. This determination is made based on, for example, whether the user has selected a compression recording mode in shooting. If the user has selected the compression recording mode, it is determined to compression-encode the image data before recording. If the user has not selected the compression recording mode, it is determined to record the image data without compression-encoding it.

If it is determined in S204 to record the image data without compression-encoding it, the process shifts to S206. If it is determined to compression-encode the image data before recording, the process shifts to S205.

In S205, the image data stored in the internal memory 107 is compression-encoded. For example, the image data stored in the internal memory 107 is supplied to the compression encoding unit 108 via the digital processor 105 and compression-encoded according to a predetermined scheme. For example, the image data having undergone the image process in S203 is compression-encoded in accordance with a lossy compression encoding method such as JPEG. Lossless compression encoding can be done for image data not processed in S203. The internal memory 107 stores the compression-encoded image data.

In S206, attribute information is added to the image data stored in the internal memory 107. The attribute information regards shooting conditions such as the shooting date & time, shooting model, flash ON/OFF, and recording format. In S207, the image data to which the attribute information has been added in S206 is recorded as a file on the storage medium 111.

Reduced image (thumbnail) data for displaying the reduced image of image data input in S201 can be generated and stored in a file together with the image data and attribute information in S207. For example, when the internal memory 107 stores image data in S201, the CPU 106 causes the digital processor 105 to reduce the image data, generating reduced image data. The compression encoding unit 108 may compression-encode the reduced image data. In S207, the reduced image data is stored in a file together with corresponding image data.

<Example of Structure of Image File>

Figure 3:
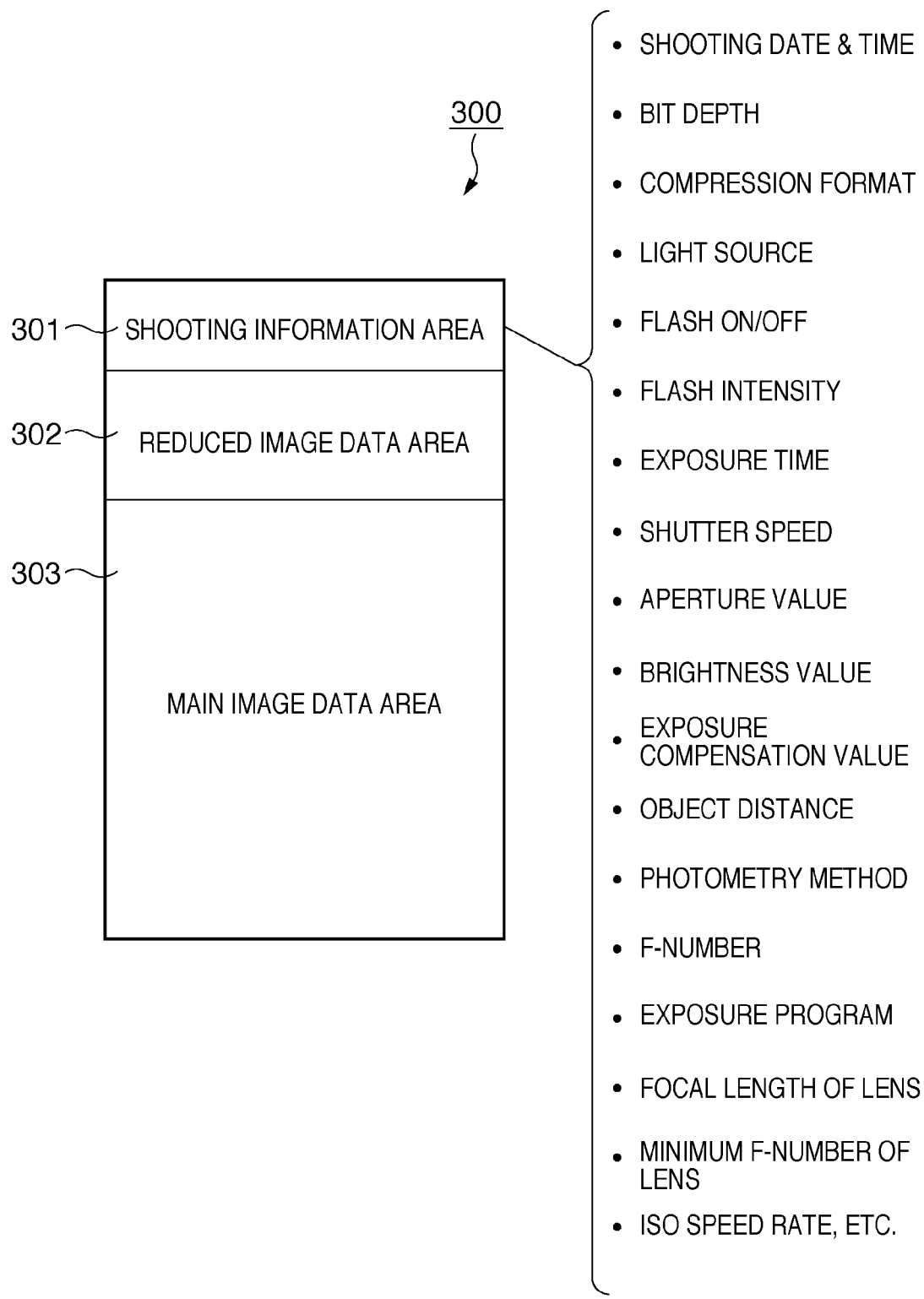
FIG. 3 is a view schematically exemplifying the structure of an image file recorded on a storage medium.

FIG. 3 schematically exemplifies the structure of an image file 300 recorded on the storage medium 111 in S207. In the example of FIG. 3, respective data areas are arranged in the image file 300 in order of a shooting information area 301, reduced image data area 302, and main image data area 303 from the start.

The main image data area 303 stores image data generated by the processes of S201 to S205 described above. For example, when the RAW image output mode is selected in the digital still camera 100, the main image data area 303 stores uncompressed or losslessly compressed RAW image data.

The reduced image data area 302 stores reduced image data mentioned above.

The shooting information area 301 stores shooting information added to image data in S206. The shooting information is made up of information when image data stored in the main image data area 303 was obtained, including the data size, bit depth, compression method, shooting date & time, shooting model, and flash ON/OFF of the image data, and information necessary to read out, play back, and select an image. Also, information indicating the model of an image capturing apparatus which generated image data stored in the main image data area 303 is stored as the shooting information.

In addition to them, the shooting information can include various kinds of information. For example, the shooting information may include characteristic information of the solid-state image sensor 103 such as the shooting range and optical black range, and the charge amount of the optical black portion. Note that the optical black portion means an unexposed portion of the solid-state image sensor 103. The shooting information may include information regarding shooting conditions, such as information indicating the shutter speed, exposure time, aperture, ISO sensitivity, flash intensity, exposure compensation value, object distance, F-number, exposure program, and the color temperature of a light source which illuminates an object. Further, the shooting information may include information regarding the specifications of the digital still camera 100, such as the type and model name of the solid-state image sensor 103 and the focal length of the lens.

<Development Process>

An image process for uncompressed or losslessly compressed RAW image data stored in a file according to the flowchart of FIG. 2 will be explained.

<Definitions of Terms>

An image process executed to obtain an output image from main image data based on a RAW image will be called a development process. An information set necessary for the development process will be called development process parameters. Attribute information regarding development process parameters will be called development process parameter attribute information. Information containing both development parameters and development process parameter attribute information will be called development process information.

Examples of the development process executed for main image data based on a RAW image are a white balance process, color adjustment process, brightness adjustment process, edge enhancement process, rotation process, partial extraction process, and enlargement/reduction process.

The development process parameter attribute information includes information on a development processing apparatus capable of reflecting development process parameters, and the creation date & time and update date & time of the development process parameters. The information on a development processing apparatus capable of reflecting development process parameters includes, for example, information capable of identifying a development processing apparatus and development processing software compatible with the development process parameters. As this information, identification information for identifying the development processing apparatus and development processing software is used. The development process parameter attribute information further includes information on the level of preference or importance of image data, and the author of the development process parameters. Also, the development process parameter attribute information includes information indicating a person assumed by the author of the development process parameters to be a partner who is to view an image obtained by reflecting the development process parameters in a RAW image.

<Image Processing Apparatus>

Figure 4:
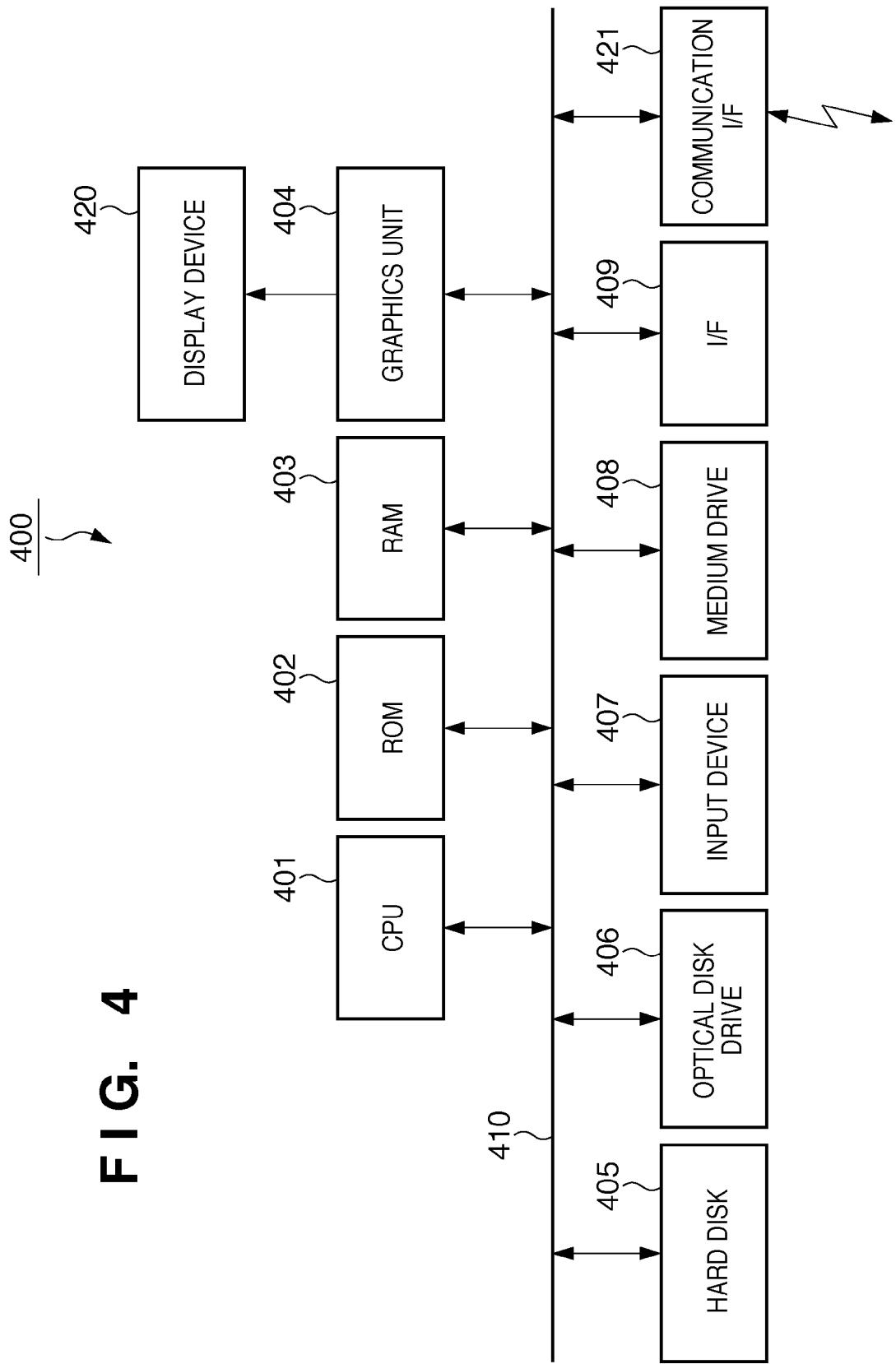
FIG. 4 is a block diagram exemplifying the arrangement of an image processing apparatus applicable to the embodiment of the present invention.

FIG. 4 exemplifies the arrangement of a development processing apparatus 400 applicable to the embodiment of the present invention. As shown in FIG. 4, the development processing apparatus 400 can be implemented by the same arrangement as that of a general personal computer. For example, predetermined development processing software runs on the personal computer, causing the personal computer to function as the development processing apparatus 400.

In the development processing apparatus 400, a CPU 401, ROM 402, RAM 403, and graphics unit 404 are connected to a bus 410. A hard disk (HD) 405, optical disk drive 406, input device 407, medium drive 408, and communication I/F 409 are also connected to the bus 410. Further, a communication I/F 421 is connected to the bus 410. The bus 410 is formed from an address bus, data bus, and control bus. The respective units of the development processing apparatus 400 can exchange data via the bus 410.

The CPU 401 operates in accordance with a program and controls the overall development processing apparatus 400. The ROM 402 stores in advance the operation processing procedures of the CPU 401 (e.g., programs for a computer boot process and basic input/output process). The RAM 403 is used as the main memory of the CPU 401. Various programs including a control program for implementing a process to be described later are read out from the hard disk 405 and expanded in the RAM 403. The CPU 401 executes a variety of control operations in accordance with the program expanded in the RAM 403. The RAM 403 provides a work area when the CPU 401 executes various kinds of processes.

The hard disk 405 is used to save and read an application program, data, library, and the like. The optical disk drive 406 reproduces data recorded on an optical disk such as a CD-ROM or DVD. The optical disk drive 406 may be designed to be able to write data on a recordable optical disk. A magnetic tape drive such as a flexible disk drive, magneto-optical disk drive, tape streamer, or DDS may be arranged additionally.

The input device 407 including a pointing device (e.g., mouse) and a keyboard accepts an input operation by the user and outputs a control signal corresponding to the operation. The graphics unit 404 outputs a display signal capable of display on a display device 420 based on a display control signal generated by the CPU 401.

The medium drive 408 receives a detachable storage medium and reads/writes data from/in it. The medium drive 408 allows mounting, for example, the storage medium 111 exemplified in FIG. 1.

The interface (I/F) 409 is used to communicate data with an external device, and can be connected to, for example, the interface 110 of the digital still camera 100 exemplified in FIG. 1. By connecting the interface 110 of the digital still camera 100 and the interface 409 of the development processing apparatus 400, the development processing apparatus 400 can receive an image data file transmitted from the digital still camera 100. The interface 409 and interface 110 comply with, e.g., the USB format.

The communication interface (I/F) 421 is connected to a communication network such as the Internet or LAN, and communicates data with an external information processing apparatus via the communication network.

<Detailed Description of Development Process>

The development process in the development processing apparatus 400 will be described in more detail. In practice, the development processing apparatus 400 is a program executed in an information processing apparatus such as a personal computer, and thus will be called development processing software, as needed.

Figure 5:
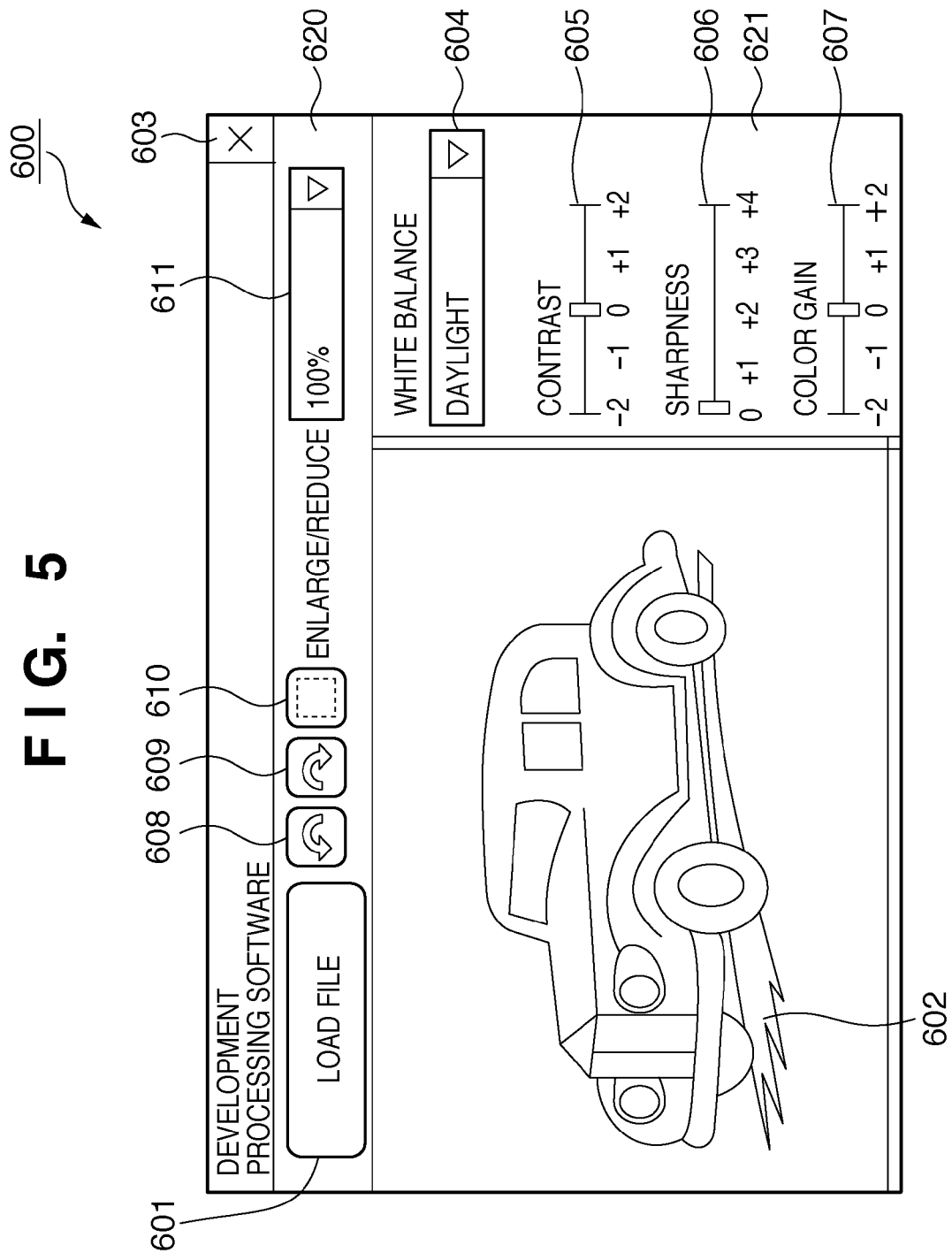
FIG. 5 is a view exemplifying a dialog box provided by the user interface of the image processing apparatus.

FIG. 5 exemplifies a dialog box 600 provided by the user interface (UI) of the development processing apparatus 400, i.e., development processing software. An upper area 620 of the dialog box 600 has a Load File button 601 for loading the image file 300. When the user manipulates the Load File button 601 with the input device 407 such as a pointing device (e.g., mouse), a standard File Open dialog box (not shown) appears. With the File Open dialog box, the user can select an image file to be processed. An image display area 602 displays an image obtained by performing a predetermined development process for RAW image data stored in the selected image file.

The area 620 has various operational members 608 to 611 for operating coordinate information of an image displayed in the area 602. The operational member 608 is a 90° counterclockwise rotation button for rotating an image counterclockwise through 90°, and the operational member 609 is a 90° clockwise rotation button for rotating an image clockwise through 90°. The operational member 610 is a clip button designating partial extraction of an image. The user manipulates the operational member 610 and then drags a rectangle in the image display area 602, thereby designating a partial extraction process for extracting the rectangular portion. To cancel the partial extraction process, the user manipulates the operational member 610 again.

The operational member 611 is an enlargement/reduction list box designating an enlargement/reduction process for an image. A ratio of 1:1 between the number of pixels of displayed image data and that of pixels of an output device (e.g., the display device 420) is defined as actual pixels or a magnification of 100%. The list box 611 represents a magnification in percentage in accordance with the ratio between the number of pixels of displayed image data and that of pixels of an output device. For example, the user selects 25% to reduce image data at a ratio of 4:1 and output it, and 400% to enlarge it at a ratio of 1:4 and output it.

An area 621 has various operational members 604 to 607 for operating parameters to adjust the image quality. The operational member 604 is a list box for selecting the light source of light irradiating an object in white balance adjustment. The light source is selectable from, e.g., daylight, cloudy, fluorescent light, tungsten light, and strobe light. The operational member 605 is a slider bar for setting the contrast, the operational member 606 is a slider bar for setting the degree of edge enhancement, and the operational member 607 is a slider bar for setting the color gain.

The display on the image display area 602 quickly reflects the process results of manipulating the operational members 604 to 607 and 608 to 611.

A button 603 arranged at the upper left corner of the dialog box 600 is an end button for ending the development processing software.

Figure 6:
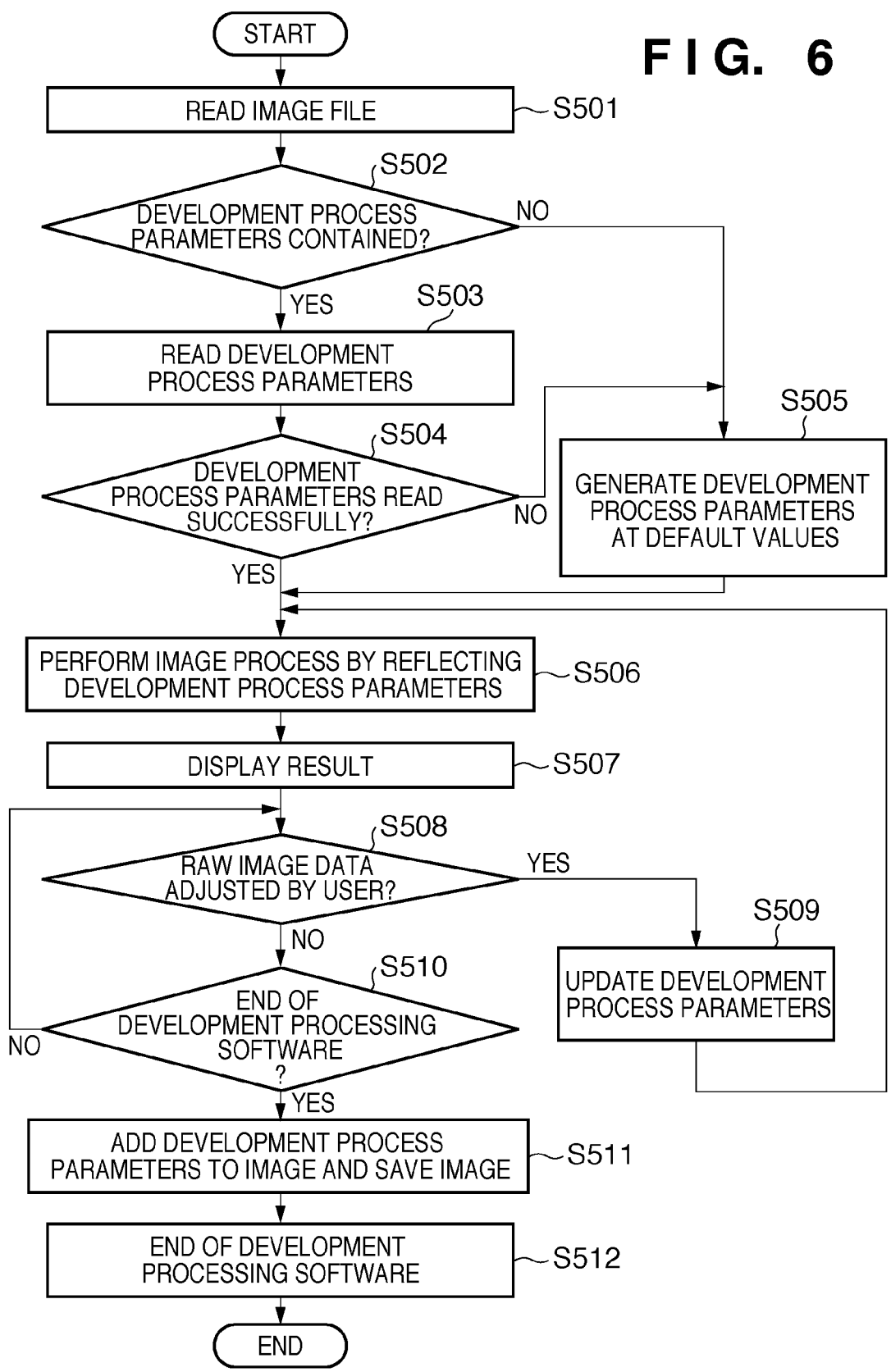
FIG. 6 is a flowchart exemplifying a development process applicable to the embodiment of the present invention.

FIG. 6 is a flowchart exemplifying a development process applicable to the embodiment of the present invention. The process based on the flowchart of FIG. 6 is executed when the CPU 401 executes a control program (development processing software) stored in the RAM 403. Steps of the development process will be explained with reference to FIG. 6. At the same time, the correspondence between a user operation in each step and an operational member manipulated in the user interface of FIG. 5 will be described.

In S501, an image file 300 selected by the user as an image process target from the hard disk 405 or medium drive 408 is loaded in the RAM 403. For example, the user selects an image file 300 he wants from a standard File Open dialog box which appears by manipulating the Load File button 601. After the image file 300 is selected, it is read out from the hard disk 405 or medium drive 408 and stored in the RAM 403.

At this time, the RAW image data stored in the main image data area 303 is read out from the selected image file 300, and shooting information stored in the shooting information area 301 is read out. Further, reduced image data stored in the reduced image data area 302 is read out. The RAM 403 stores the readout RAW image data, shooting information, and reduced image data.

In S502, it is determined whether the image file 300 read out in S501 contains development process parameters. For example, the sum of the data sizes of the shooting information, reduced image data, and main image data is compared with the total data size of the image file 300. If the total data size of the image file 300 is larger than the sum of the data sizes of the shooting information, reduced image data, and main image data as a result of the comparison, it is determined that the image file 300 contains development process parameters.

If it is determined that the image file 300 does not contain development process parameters, the process shifts to S505 to generate development process parameters at default values. The development processing apparatus 400 sets the default values in advance, and for example, white balance=daylight, contrast=0, sharpness=0, color gain=0, rotation angle=0°, extraction process=OFF, and enlargement/reduction magnification=100%. Details of generation of the development process parameters will be described later.

If it is determined in S502 that the image file 300 contains development process parameters, the process shifts to S503. Development process parameters associated with the running development processing software are read out from the image file 300 and stored in the RAM 403. A method of reading out development process parameters will be described later.

After reading out development process parameters, it is determined in S504 whether the development process parameters have been read successfully. For example, when a value falling outside a predetermined range exists among the values of the development process parameters, it is determined that there is invalid data, reading stops, and it is determined that reading of the development process parameters has failed. If it is determined that reading of the development process parameters has failed, the process shifts to S505 to generate development process parameters at default values.

If the development process parameters have been read successfully in S504 or development process parameters are generated at default values in S505, the process shifts to S506.

In S506, the development process parameters are applied to the RAW image data which has been read out from the main image data area 303 of the image file 300 and stored in the RAM 403. More specifically, the RAW image data read out from the image file 300 undergoes a development process in accordance with the development process parameters. The result of the development process is displayed in, for example, the image display area 602 in S507.

In S508, it is determined whether the user has adjusted the RAW image data. This can be determined based on, for example, whether the user has manipulated the operational members 604 to 611 for instructing image quality adjustment or coordinate operation. If it is determined that the user has adjusted the RAW image data, the process shifts to S509 to update the development process parameters in accordance with the manipulation of the operational members 604 to 611 by the user. Details of update of the development process parameters will be described later. After updating the development process parameters, the process returns to S506 to perform the development process based on the updated development process parameters for the RAW image data stored in the RAM 403.

If it is determined in S508 that the user has not adjusted the RAW image data, the process shifts to S510. In S510, it is determined whether to end a series of development processes. For example, whether to end the series of development processes can be determined depending on whether the user has manipulated the end button 603. More specifically, if the user has manipulated the end button 603, it is determined to end the series of development processes. If it is determined not to end the series of development processes, the process returns to S508 to accept an adjustment operation by the user.

If it is determined in S508 to end the series of development processes, the process shifts to S511. In S511, an image file is generated by adding development process information containing the development process parameters and development process parameter attribute information to the RAW image data. The image file is saved in the hard disk 405 or the storage medium 111 loaded into the medium drive 408. The development process information save process will be described later. After saving the image file, the development processing software ends in S512.

The development process parameter attribute information includes identification information for identifying development processing software which executed the series of development processes according to the flowchart of FIG. 6. The identification information is described in, for example, the program codes of the development processing software. The identification information suffices to be able to identify development processing software compatible with the same development process parameters, and need not be able to identify individual development processing software. As the identification information, the name and version of development processing software are usable.

The development process explained with reference to FIG. 6 is done for RAW image data stored in the RAM 403, and RAW image data stored in the main image data area 303 of the image file 300 is not changed. That is, in the development process according to the embodiment, an image obtained by performing the development process for RAW image data read from the main image data area 303 is not recorded. Instead, development process parameters used in the development process are recorded together with RAW image data before the development process. Every time the values of the respective development process parameters are repetitively changed, an output image is generated from main image data, so an image does not deteriorate regardless of repetitive editing.

<Example of Image File Having Development Process Information>

Figure 7:
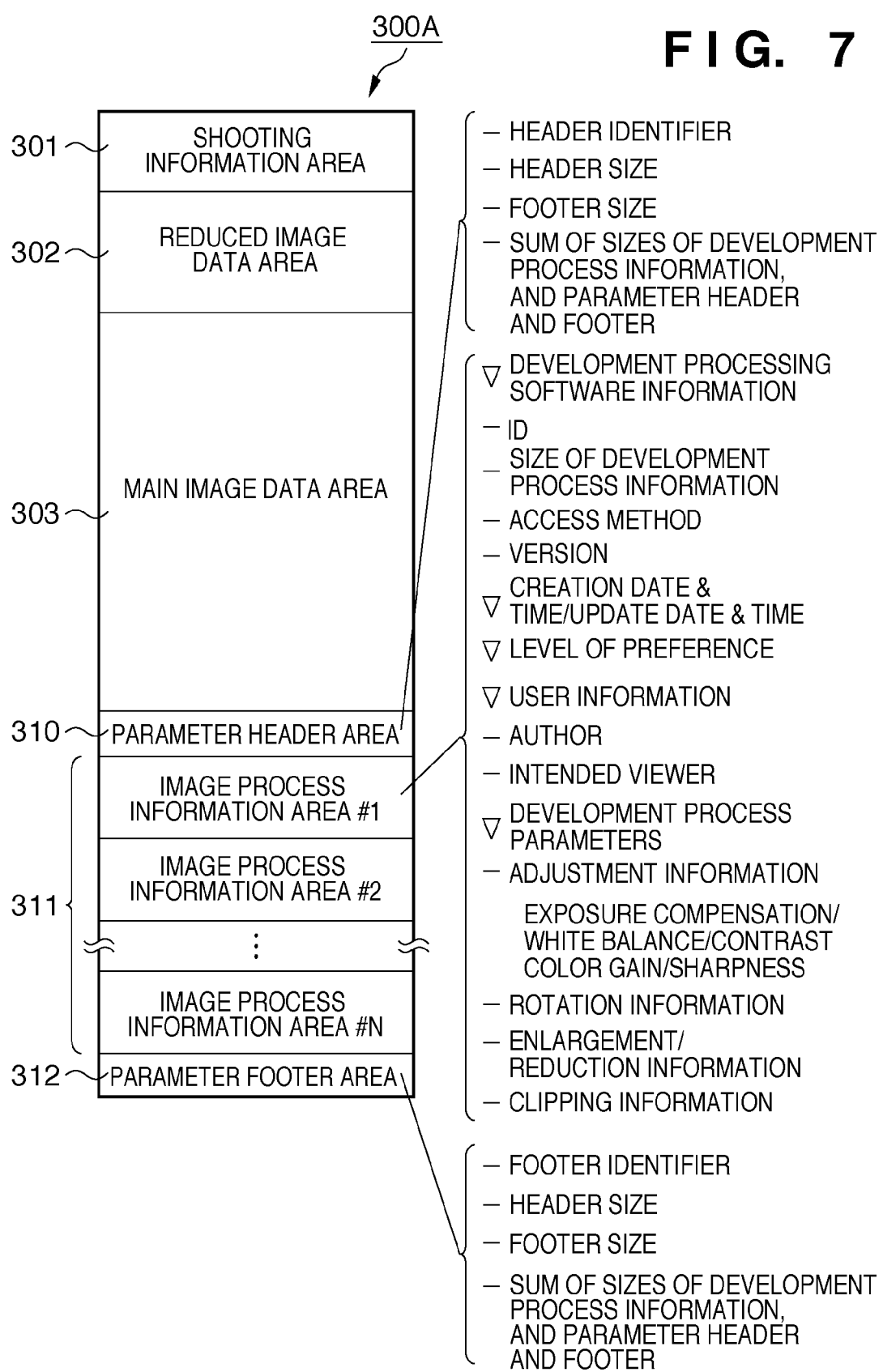
FIG. 7 is a view exemplifying the structure of an image file applicable to the embodiment of the present invention.

FIG. 7 exemplifies the structure of an image file 300A created according to the flowchart of FIG. 6. The image file 300A exemplified in FIG. 7 is generated by performing the process based on the flowchart of FIG. 6 for the image file 300 shown in FIG. 3. In FIG. 7, the same reference numerals as those in FIG. 3 denote the same parts, and a detailed description thereof will not be repeated.

As shown in FIG. 7, the image file 300A is configured by adding a parameter header area 310, development process information area 311, and parameter footer area 312 to the original image file 300.

The parameter header area 310 stores information necessary to read/write data from/in the development process information area 311. More specifically, the parameter header area 310 stores a header identifier for identifying a parameter header, and the data sizes of the parameter header area 310 and footer area 312. The header identifier and a footer identifier (to be described later) can be predetermined character strings or bit strings. Further, the parameter header area 310 stores the sum of the data sizes of the development process information area 311, parameter header area 310, and footer area 312.

The parameter footer area 312 also stores the same information as that in the parameter header area 310. More specifically, the parameter footer area 312 stores a footer identifier for identifying a parameter footer, and the data sizes of the parameter header area 310 and footer area 312. In addition, the parameter footer area 312 stores the sum of the data sizes of the development process information area 311, parameter header area 310, and footer area 312.

The development process information area 311 stores development process information formed from development process parameters generated in accordance with the process of the flowchart in FIG. 6 and attribute information of the development process parameters. In FIG. 7, the development process information area 311 can store pieces of development process information separately in areas for respective development processes, as represented by development process information area #1, development process information area #2, . . . , development process information area #N.

Examples of information stored in each development process information area will be explained. The development process information area stores development process parameters and attribute information of the development process parameters.

The development process parameter attribute information is arranged at the start of each development process information area and includes, for example:

(1) information on development processing software which generated the development process information, (2) information indicating the creation date & time and update date & time of the development process information, (3) information indicating the level of preference of an output image developed based on the development process information, and (4) user information on a user who generated the development process information.

As a detailed example, (1) information on development processing software which generated the development process information includes (1a) identification information (ID) of development processing software which generated the development process information, (1b) the data size of the development process information, (1c) information indicating how to access development processing software which generated the development process information, and (1d) the version of development processing software which generated the development process information.

As (1a) identification information of development processing software, the name of the development processing software is available. Development processing software which generated the development process information is identified using its name and version. This is because even development processing software programs having the same name may differ in compliant development process parameters depending on the version.

(4) User information on a user who generated the development process information includes (4a) identification information (e.g., user name) of a user who generated the development process information, and (4b) information indicating the intended viewer of an output image having undergone a development process using the development process information.

Note that (4b) information indicating an intended viewer is information indicating a person assumed by the user to view an output image obtained by performing a development process for RAW image data stored in the main image data area 303 using development process parameters contained in the development process information. The information indicating an intended viewer can be the name of an intended viewer.

The development process parameters include, for example:

(1) information on image quality adjustment, and (2) information on a coordinate process.

As a detailed example, (1) information on image quality adjustment includes, for example, the exposure compensation value, white balance adjustment value, contrast adjustment value, color gain adjustment value, and sharpness adjustment value. (2) Information on a coordinate process includes, for example, information on rotation, enlargement/reduction magnification, clipping (extraction) information.

In the development process information area 311, parameter header area 310, and footer area 312, for example, the data size of each item has a predetermined fixed length. For example, an item at which numerical data is stored has a data size of 32 bits, and an item at which a character string is stored has a data size of 256 bytes.

<Generation of Development Process Parameters>

Generation of development process parameters will be explained. The development processing software generates development process parameters by converting, into values, settings regarding a development process that are designated by the user by manipulating the operational members 604 to 611. The development process parameters form a development process parameter set.

Note that the meanings of the development process parameter values may be changed for each development processing software. This is because the image management apparatus (image management software) according to the embodiment of the present invention transfers the image file 300A to development processing software which generated development process parameters, or development processing software capable of using the development process parameters in playback.

In the following description, "play back RAW image data" means executing a development process for RAW image data using previously generated development process parameters.

Exemplary variables of development process parameters are defined as follows for descriptive convenience. The development process information area stores the variables in the following order:

prm_wb: white balance
prm_contrast: contrast
prm_sharpness: sharpness
prm_colorgain: color gain
prm_rotationAngle: rotation angle
prm_partRec_x0: x-coordinate of the upper left corner of the extraction position (unit: pixel)
prm_partRec_y0: y-coordinate of the upper left corner of the extraction position (unit: pixel)
prm_partRec_x1: x-coordinate of the lower right corner of the extraction position (unit: pixel)
prm_partRec_y1: y-coordinate of the lower right corner of the extraction position (unit: pixel)
prm_resolution: enlargement/reduction magnification As for the white balance prm_wb, light sources are defined at the following definition values. In this example, five types of light sources "daylight", "cloudy", "fluorescent light", "tungsten light", and "strobe light" are defined and associated with definition values of 1 to 5:
kWB_Daylight=1: daylight
kWB_Cloudy=2: cloudy
kWB_Fluorenscent=3: fluorescent light
kWB_Tangsten=4: tungsten light
kWB_Strobo=5: strobe light As for the contrast prm_contrast, sharpness prm_sharpness, and color gain prm_colorgain, the development process parameters directly hold numerical values.

As for the rotation angle prm_rotationAngle, the development process parameter holds, for example, a clockwise rotation angle for an image. When the rotation angle for an image reaches 360° or more, the numerical value of a remainder as a result of dividing the rotation angle by 360° is used as the rotation angle prm_rotationAngle.

When the user manipulates the operational member 609 once to instruct a 90° clockwise rotation for an unrotated image, the rotation angle prm_rotationAngle is 90. When the user manipulates the operational member 608 once to instruct a 90° counterclockwise rotation for an unrotated image, the rotation angle prm_rotationAngle is 360−90=270. When the user manipulates the operational member 609 five times for an unrotated image, the rotation angle prm_rotationAngle is (90×5)%360=90. Note that the operator "%" means calculating the remainder of division.

As for the extraction position, the development process parameters hold the x- and y-coordinates of the upper left corner of an extraction range set as a rectangle in main image data, and the x- and y-coordinates of the lower right corner. More specifically, the development process parameters hold the x-coordinate prm_partRec_x0 of the upper left corner, the y-coordinate prm_partRec_y0 of the upper left corner, the x-coordinate prm_partRec_x1 of the lower right corner, and the y-coordinate prm_partRec_y1 of the lower right corner. For a rotated image, the development process parameters hold coordinate information of an extraction position in main image data before rotation.

When the image capturing region in the solid-state image sensor 103 is defined by coordinates (150,100) at the upper left corner and coordinates (1750,1300) at the lower right corner in main image data, and no partial extraction process is done, the extraction positions prm_partRec are
prm_partRec_x0=150
prm_partRec_y0=100
prm_partRec_x1=1750
prm_partRec_y1=1300

When a range defined by coordinates (650,600) at the upper left corner and coordinates (1400,1100) at the lower right corner is extracted by the extraction process, the extraction positions are
prm_partRec_x0=650
prm_partRec_y0=600
prm_partRec_x1=1400
prm_partRec_y1=1100

The magnification of an enlargement/reduction process is given by percentage. For example, the magnification prm_resolution=100 at an equal magnification of 100%, and the magnification prm_resolution=25 at a magnification of 25%.

The default settings of the development process parameters are white balance=daylight, contrast=0, sharpness=0, color gain=0, rotation angle=0°, extraction process=OFF, and enlargement/reduction magnification=100%. The embodiment assumes that the image capturing region is defined by coordinates (150,100) at the upper left corner and coordinates (1750,1300) at the lower right corner in main image data. Exemplary results of converting the default settings into numerical values in accordance with the foregoing definitions in S505 of the flowchart in FIG. 6 are
prm_wb=1
prm_contrast=0
prm_sharpness=0
prm_colorgain=0
prm_rotationAngle=0
prm_partRec_x0=150
prm_partRec_y0=100
prm_partRec_x1=1750
prm_partRec_y1=1300
prm_resolution=100

Note that the default setting values may be determined based on values set by the digital still camera 100 in image capturing. For example, in S505 of the flowchart in FIG. 6, the values of the development process parameters are set according to the above-described definitions, based on information stored in the shooting information area 301 of the image file 300. For example, when white balance=cloudy, contrast=2, sharpness=2, color gain=−1, clockwise rotation angle=90°, extraction process=OFF, and enlargement/reduction magnification=100% in image capturing, exemplary default setting values are
prm_wb=2
prm_contrast=2
prm_sharpness=2
prm_colorgain=−1
prm_rotationAngle=90
prm_partRec_x0=150
prm_partRec_y0=100
prm_partRec_x1=1750
prm_partRec_y1=1300
prm_resolution=100

<Update of Development Process Parameters>

Update of development process parameters will be explained. In update of development process parameters, a setting designated by a user operation in regard to the development process is converted into a value, similar to the foregoing process when generating development process parameters. Among the development process parameters, only the changed value is updated.

Assume that the default settings are white balance=daylight, contrast=0, sharpness=0, color gain=0, rotation angle=0°, extraction process=OFF, and enlargement/reduction magnification=100%. Also assume that, at these default settings, the user manipulates the operational member 605 serving as a contrast slider bar to change the value to +2, and manipulates once the operational member 609 to instruct a 90° clockwise rotation. In this case, the development process parameters are updated as follows in S508 of the flowchart in FIG. 6 described above:
prm_wb=1
prm_contrast=2
prm_sharpness=0
prm_colorgain=0
prm_rotationAngle=90
prm_partRec_x0=150
prm_partRec_y0=100
prm_partRec_x1=1750
prm_partRec_y1=1300
prm_resolution=100

More specifically, the values of the contrast prm_contrast and rotation angle prm_rotationAngle that have been changed from default settings by the user operation are updated.

<Generation of Development Process Parameter Attribute Information>

Generation of development process parameter attribute information will be described. Similar to the development process parameters, the development process parameter attribute information is generated by converting information into a numerical value or character string.

The representation of the development process parameter attribute information desirably complies with a format interpretable by the image management apparatus (to be described later) according to the embodiment of the present invention. More specifically, the image management apparatus compares pieces of development process parameter attribute information generated by a plurality of development processing software programs in order to determine development process parameters used in a development process for RAW image data.

Exemplary variables of development process parameter attribute information are defined as follows for descriptive convenience. The development process information area stores the variables in the following order:

prm_appID: identification information of development processing software compatible with development process parameters
prm_sizeofPrm: size of image process information (unit: byte)
prm_year: creation or update year
prm_month: creation or update month
prm_day: creation or update day
prm_hour: creation or update time (hour)
prm_minute: creation or update time (minute)
prm_second: creation or update time (second)
prm_appPcPhysicalAddress: physical address of an information processing apparatus which executes development processing software that edited development process parameters
prm_appPath: path of development processing software that edited development process parameters
prm_appVer: version of development processing software that edited development process parameters
prm_importance: level of preference (or importance)
prm_author: author of development process parameters
prm_viewer: viewer intended by the author of development process parameters Among the respective items of the development process parameter attribute information, an item at which a numerical value is set has a data size of 32 bits, and an item at which a character string is set has a data size of 256 bytes. For example, 256-byte character strings are set at the physical address prm_appPcPhysicalAddress, path prm_appPath, version prm_appVer, author prm_author, and intended viewer prm_viewer.

Since development process information can be held for each development processing software, the total size prm_sizeofPrm of the development process information changes depending on the held information. Thus, the total size prm_sizeofPrm of the development process information is generated dynamically when recording the image file 300A. For example, information of the size prm_sizeofPrm can be obtained using the function of an OS in an information processing apparatus on which development processing software runs.

The date and/or time information (prm_year, prm_month, prm_day, prm_hour, prm_minute, and prm_second) indicating the date and/or time of creation or update is generated in the same way. That is, when recording the image file 300A, the date and/or time information is generated dynamically using the function of an OS or the like in an information processing apparatus on which development processing software runs.

The physical address prm_appPcPhysicalAddress of the information processing apparatus can be a MAC address assigned in advance to the communication I/F 421. The MAC address stands for Media Access Control address.

The path prm_appPath of the development processing apparatus is information indicating the location of the execution file of development processing software. The path prm_appPath can be information (e.g., directory information or folder information) indicating the position of the execution file in the hard disk 405. However, the path prm_appPath is not limited to this and can be information (e.g., URL) indicating a position in a network connected via the communication I/F 421.

The physical address prm_appPcPhysicalAddress and path prm_appPath change depending on an information processing apparatus which incorporates development processing software, and the position of a storage area in the hard disk 405 of the information processing apparatus. Hence, when recording the image file 300A, the physical address prm_appPcPhysicalAddress and path prm_appPath are generated dynamically using the function of an OS or the like in an information processing apparatus on which development processing software runs.

The level of preference prm_importance, author prm_author, and intended viewer prm_viewer are set based on a user input via the input device 407. For example, at the timing when it is determined in S510 of the flowchart in FIG. 6 that the user has manipulated the end button 603, a dialog box 630 exemplified in FIG. 8 appears and accepts an input from the user.

Figure 8:
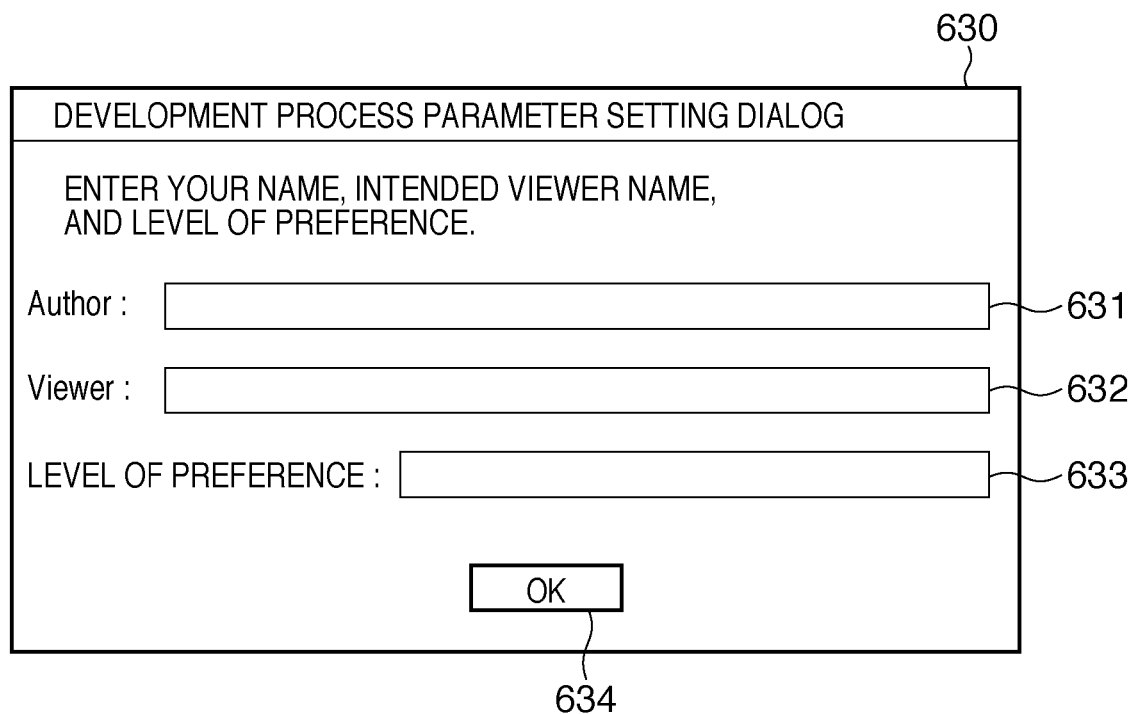
FIG. 8 is a view exemplifying a dialog box for entering an author, intended viewer, and level of preference.

In the example of FIG. 8, the dialog box 630 has entry fields 631, 632, and 633 and an OK button 634. The entry field 631 receives the author prm_author. For example, the entry field 631 receives information (e.g., name) indicating an author who changed, i.e., edited development process parameters. The entry field 632 receives the intended viewer prm_viewer. For example, the entry field 632 receives information (e.g., name) indicating a partner who is to view an output image obtained by performing a development process for RAW image data using development process parameters. The entry field 633 receives the level of preference prm_importance. For example, the entry field 633 receives the level of preference by the author for an output image obtained by performing a development process for RAW image data using development process parameters. The entry field 633 may present a plurality of levels of preference set in advance and allow the user to select one of the displayed levels.

If the user does not enter information to at least one of the entry fields 631 to 633, the process is done without the input. For example, a character string "NULL" indicating the absence of data may be set at an item to which no data is entered. When the data size of an entered character string exceeds 256 bytes, a warning such as "Entered characters exceed the upper limit. Excess of entered characters over the upper limit will be deleted." is displayed and an input exceeding 256 bytes is discarded.

Exemplary results of obtaining information necessary to generate development process parameter attribute information are
(a) ID of the image processing apparatus=7
(b) total size of image process information=5 kbytes
(c) creation date & time=2006/09/01 19:25:11
(d) physical address of the information processing apparatus=01-02-03-0A-0B-0C
(e) path of the image processing apparatus=C:¥ProgramFiles¥App¥App_0001.exe
(f) version of the image processing apparatus=1.2.0.8
(g) level of preference=+5
(h) author name of development process parameters=UserA
(i) viewer intended by the author of development process parameters=UserB In this case, the variable values of the development process parameter attribute information are
prm_appID=7
prm_sizeofPrm=5000
prm_year=2006
prm_month=9
prm_day=1
prm_hour=19
prm_minute=25
prm_second=11
prm_appPcPhysicalAddress=01-02-03-0A-0B-0C
prm_appPath=C:¥ProgramFiles¥App¥App_0001.exe
prm_appVer=1.2.0.8
prm_importance=5
prm_author=UserA
prm_viewer=UserB <Recording of Development Process Information>

Development process information generated or updated in the above-described manner is recorded on the storage medium 111 in S511 of FIG. 6. At this time, a numerical parameter has a date length of signed 32 bits, and a character string has a data length of a 256-byte array. Development process parameter attribute information and development process parameters are stored in the order named for each development process information in the development process information area 311. The respective items in the development process parameter attribute information and development process parameters are stored in the foregoing order.

<Method of Generating Parameter Header and Footer>

Generation of a parameter header and footer will be explained. In S511 of FIG. 6, a parameter header and footer are generated. Even if it is determined in S502 of FIG. 6 that there is no development process parameter, a parameter header and footer are generated in S511. The generated parameter header and footer are stored in the parameter header area 310 and footer area 312, respectively, and added to the image file 300A together with the above-mentioned development process information.

As described above, the parameter header area 310 stores a header identifier, header size, and footer size. The parameter header area 310 also stores the sum of the size of all pieces of development process information stored in the development process information area 311, and the sizes of the parameter header and footer.

As the header identifier, information capable of identifying the start position of the parameter header area 310 is used. In this example, a character string "ParamHeader" is used as the header identifier.

Exemplary variables of the parameter header area 310 are defined as follows for descriptive convenience. The parameter header area 310 stores the variables in the following order after the header identifier:

prm_sizeofPrm: data size of the development process information area 311 (unit: byte)
paramSizeOfHeader: data size of the parameter header area 310 (unit: byte)
paramSizeOfFooter: data size of the parameter footer area 312 (unit: byte)
paramSizeSum: sum of the data sizes of the development process information area 311, parameter header area 310, and footer area 312 (unit: byte)

The total data size paramSizeSum is calculated by the following equation (1):

$$\text{paramSizeSum} = \text{paramSizeOfHeader} + \text{paramSizeOfFooter} + \text{prm\_sizeofPrm} \quad (1)$$

As described above, the parameter footer area 312 stores a footer identifier, header size, and footer size. The parameter footer area 312 also stores the sum of the size of all pieces of development process information stored in the development process information area 311, and the sizes of the parameter header and footer. As the footer identifier, information capable of identifying the start position of the parameter footer area 312 is used. In this example, a character string "ParamFooter" is used as the footer identifier. The structure of the parameter footer area 312 is the same as that of the parameter header area 310 except for the footer identifier, so a detailed description thereof will not be repeated. The total data size paramSizeSum is similarly calculated in accordance with equation (1).

If it is determined in S502 of FIG. 6 that the image file contains development process parameters, the total data size paramSizeSum held in the parameter header area 310 and footer area 312 is updated in S511, as needed.

The total data size paramSizeSum need to be updated when, for example, the data size of development process information stored in the image file 300A has changed upon executing the process of the flowchart in FIG. 6. Also, the total data size paramSizeSum need to be updated when the image file 300A is reproduced by development processing software different from one which generated development process information stored in the image file 300A, and development process information is newly added to the image file 300A.

For example, a case will be examined, in which the image file 300A read in S501 of FIG. 6 stores one development process information #1 generated by development processing software #1. In this case, variables stored in the parameter header area 310 except for the header identifier are prm_sizeofPrm1: data size of development process information #1 generated by development processing software #1
paramSizeOfHeader: size of the parameter header
paramSizeOfFooter: size of the parameter footer
paramSizeSum1: sum of the data sizes of the parameter header and footer, and development process information #1 when the development process information area 311 stores only development process information #1

The total data size paramSizeSum1 is calculated by the following equation (2):

$$\text{paramSizeSum1} = \text{paramSizeOfHeader} + \text{paramSizeOfFooter} + \text{prm\_sizeofPrm1} \quad (2)$$

A case will be examined, in which development processing software #2 reproduces the image file 300A and development process information #2 generated by development processing software #2 is added to the image file 300A. In this case, the parameter header area 310 needs to store a total data size paramSizeSum2 when there are development process information #1 generated by development processing software #1 and development process information #2 generated by development processing software #2.

The total data size paramSizeSum2 is calculated by the following equation (3):

$$\text{paramSizeSum2} = \text{paramSizeOfHeader} + \text{paramSizeOfFooter} + \text{prm\_sizeofPrm1} + \text{prm\_sizeofPrm2} \quad (3)$$

where the variable prm_sizeofPrm2 is the data size of development process information #2 generated by development processing software #2.

When development processing software #2 adds development process information #2, the data size of development process information #1 which was generated by development processing software #1 and has already been stored need not always be obtained. A total data size calculation method in this case is given by the following equation (4):

$$\text{paramSizeSumBef} = \text{paramSizeOfHeader} + \text{paramSizeOfFooter} + \text{prm\_sizeofPrm1} \quad (4)$$

Equation (4) is true, so the following equation (5) is also true:

$$\text{paramSizeSumAft} = \text{paramSizeSumBef} + \text{prm\_sizeofPrm2} \quad (5)$$

Thus, $$\text{paramSizeSum2} = \text{paramSizeSumAft} \quad (6)$$

where the variable paramSizeSumBef is a total data size (unit: byte) before adding development process information #2 generated by development processing software #2, and the variable paramSizeSumAft is a total data size (unit: byte) after adding development process information #2 generated by development processing software #2.

This description is directed to a method of calculating the sum of the data sizes of the parameter header and footer, and development process information when development processing software #2 reproduces the image file 300A recorded by development processing software #1. However, the calculation method is not limited to this example, and the sum of data sizes can also be calculated similarly even when adding development process information by another development processing software. A total data size calculation method in this case is given by the following equation (7):

$$\text{paramSizeSum} = \text{paramSizeOfHeader} + \text{param-SizeOfFooter} + \text{prm\_sizeofPrm1} + \text{prm\_sizeof-Prm2} + \ldots + \text{prm\_sizeofPrmN} \quad (7)$$

<Reading of Development Process Information>

Figure 9:
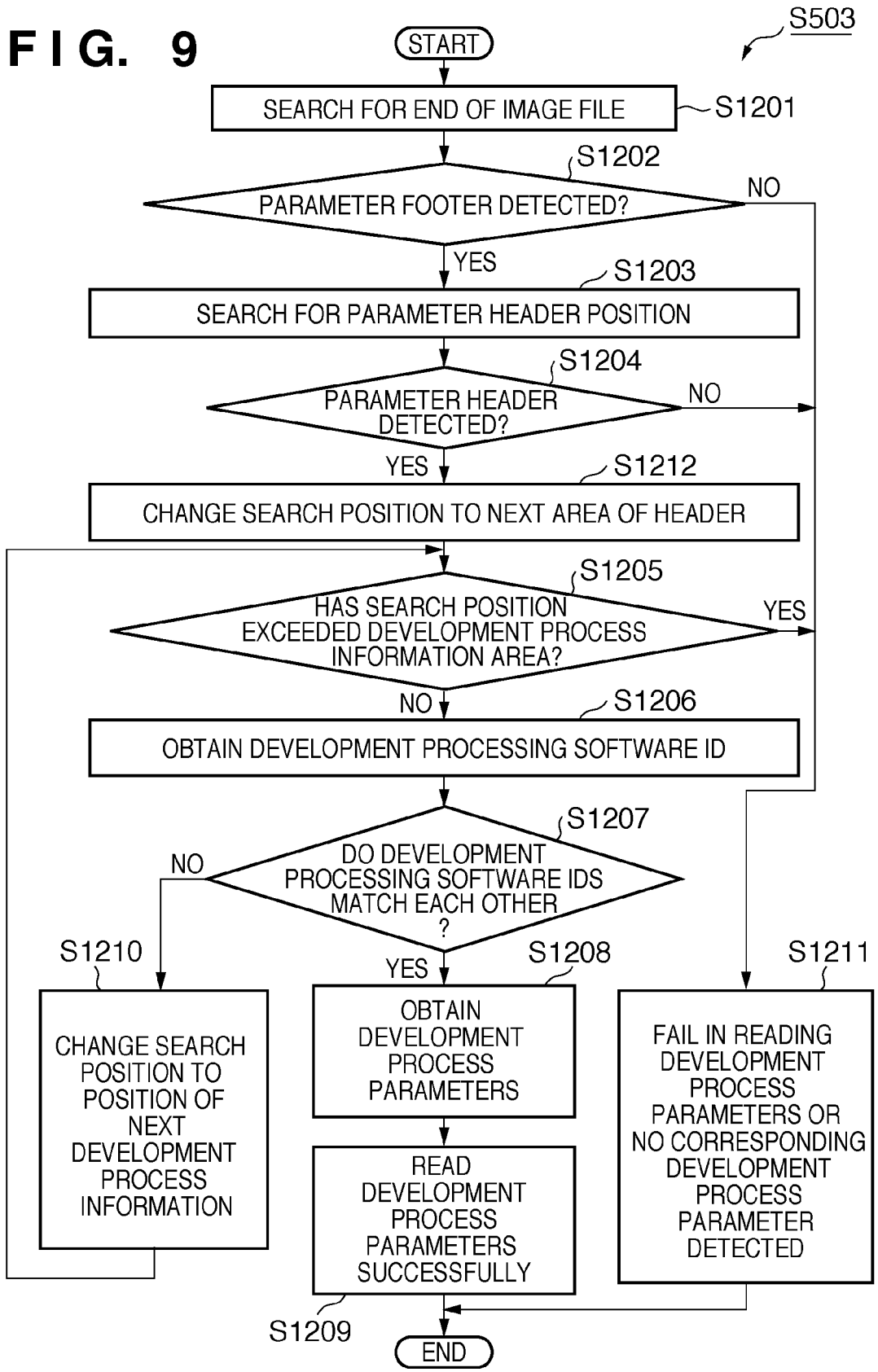
FIG. 9 is a flowchart exemplifying a development process information reading process according to the embodiment of the present invention.

A process of reading development process information which is generated in the above-described fashion and added to the image file 300A will be explained. FIG. 9 is a flowchart exemplifying a development process information reading process according to the embodiment of the present invention. The process based on the flowchart of FIG. 9 corresponds to the process of S503 in the flowchart of FIG. 6.

Prior to the process in the flowchart of FIG. 9, the image file 300A is loaded by the process of S501 in the flowchart of FIG. 6 described above. If it is determined that the loaded image file 300A contains development process parameters (S502), the process shifts to S1201 in FIG. 9.

In S1201, the end of the image file 300A read in S501 is searched for. In S1202, it is determined whether the footer identifier and the total data size paramSizeSum have been detected as a result of the search in S1201.

For example, if the end of the image file 300A is detected, the search position returns from the detected end position toward the start of the file by a predetermined distance, and it is determined whether the footer identifier is detected. In this example in which the data size of a numerical value is set to 32 bits, the search position returns from the file end by 32 bits×4=128 bits=16 bytes, and the footer identifier is searched for. If the footer identifier ("ParamFooter" in this example) is detected from this position, the search position further advances by a predetermined distance to try to detect the total data size paramSizeSum.

If neither the footer identifier nor total data size paramSize-Sum is detected in S1202, the process shifts to S1211. It is determined that reading of development process parameters has failed or there is no development process parameter, a series of processes ends.

If it is determined in S1202 that the footer identifier and total data size paramSizeSum have been detected, the process shifts to S1203. In S1203, the search position changes to the start of the parameter header area 310 based on the total data size paramSizeSum detected in S1202. In S1204, it is determined whether the header identifier has been detected as a result of the search in S1203.

If it is determined that no header identifier has been detected, the process shifts to S1211, ending a series of processes.

If it is determined in S1204 that the header identifier has been detected, the process shifts to S1212. In S1212, the data size paramSizeOfHeader of the parameter header area 310 is obtained based on the position of the header identifier, and the search position changes to the next area of the parameter header area 310.

In S1205, it is determined whether the search position has exceeded the entire development process information area 311. For example, the data size paramSizeOfFooter of the footer is obtained based on the position of the header identifier. If the moving distance from the start of the parameter header area 310 is larger than the difference of the data size paramSizeOfFooter of the footer from the total data size paramSizeSum, it is determined that the search position has exceeded the entire development process information area 311.

If it is determined that the search position has exceeded the entire development process information area 311, the process shifts to S1211, ending a series of processes.

If it is determined in S1205 that the search position has not exceeded the entire development process information area 311, the process shifts to S1206. In S1206, development process parameter attribute information stored in a development process information area (e.g., development process information area #1) within the development process information area 311 is searched for. Then, identification information (ID) of development processing software which generated information in development process information area #1 is obtained.

After obtaining the identification information of development processing software, it is determined in S1207 whether identification information of development processing software which now executes a process matches the identification information obtained in S1206. If it is determined that the pieces of identification information match each other, the process shifts to S1208 to obtain development process parameters stored in development process information area #1. At this time, development process parameter attribute information may also be obtained together. In S1209, a flag is set to represent that the development process parameter reading process is successful. The reading process then ends.

If it is determined in S1207 that the pieces of identification information do not match each other, the process shifts to S1210. The search position moves to the next development process information area (development process information area #2 in this example) using the data size prm_sizeofPrm contained in development process parameter attribute information in development process information area #1. After that, the process returns to the determination process in S1205.

<Image Management Apparatus>

The image management apparatus according to the embodiment of the present invention will be described. The image management apparatus according to the embodiment can be implemented by the same arrangement as that of the development processing apparatus 400 described with reference to FIG. 4, so an illustration and detailed description thereof will not be repeated. More specifically, in the arrangement of FIG. 4, the CPU 401 reads and executes an image management program for executing the function of the image management apparatus. This allows the development processing apparatus 400 shown in FIG. 4 to function as the image management apparatus according to the embodiment.

Figure 10:
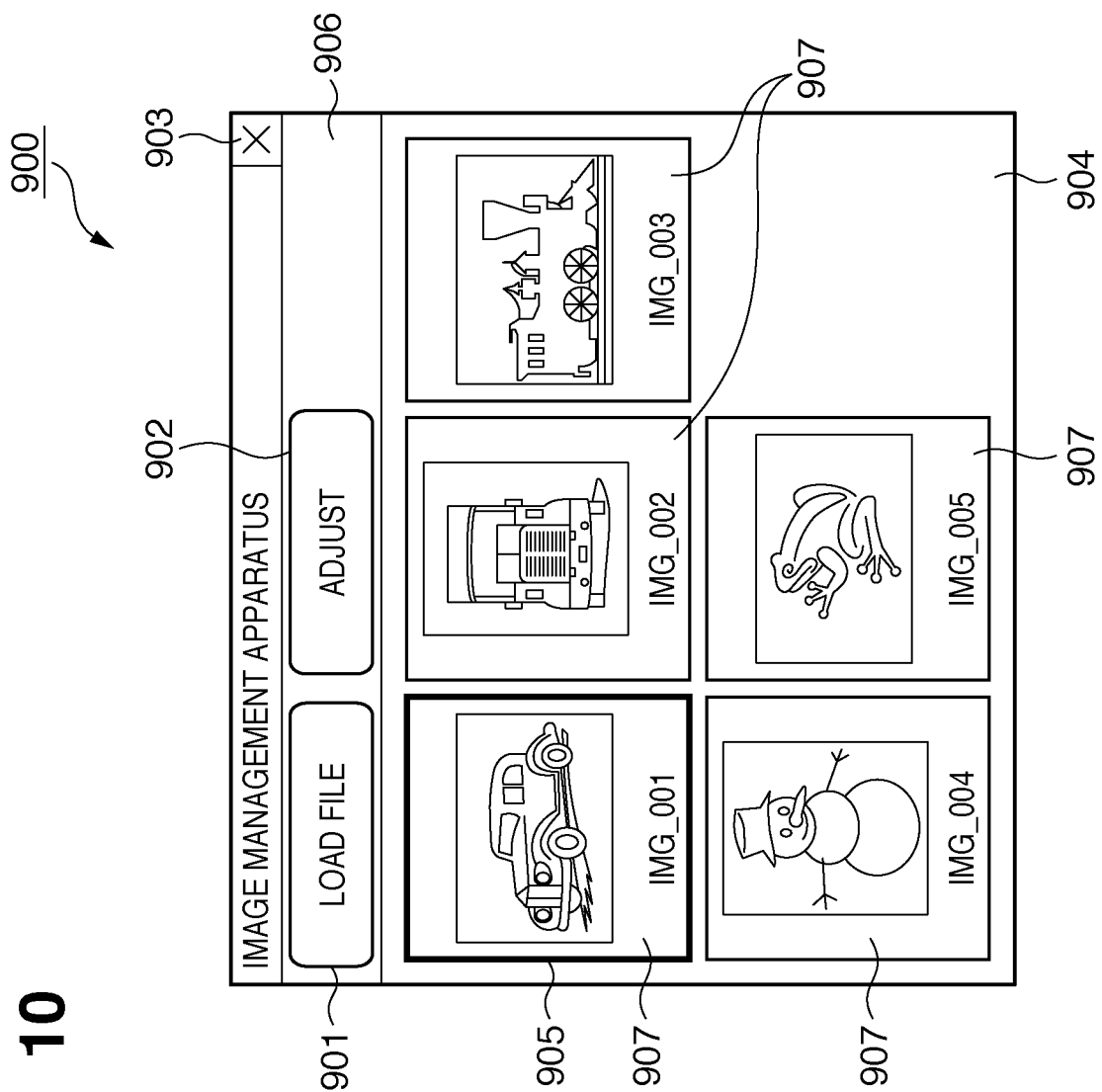
FIG. 10 is a view exemplifying a user interface in an image management apparatus according to the embodiment of the present invention.

FIG. 10 exemplifies a user interface in the image management apparatus according to the embodiment. In a dialog box 900, an area 906 has a Load File button 901, Adjust button 902, and End button 903. The Load File button 901 is used to select an image file. When the user manipulates the Load File button 901, a standard File Open dialog box appears. The user can select the image file 300 or 300A to be processed in the File Open dialog box.

Below the area 906, a list image display area 904 is arranged as a display area for a list of images. The list image display area 904 displays the reduced images of images in an image file selected by manipulating the Load File button 901.

For example, reduced image data to be stored in the reduced image data area 302 are read out from the image file 300 or 300A selected by manipulating the Load File button 901, and displayed as reduced images 907 for each image file in the list image display area 904.

The user moves the cursor with, e.g., a pointing device to a reduced image to be processed among the reduced images 907 displayed in the list image display area 904, and then performs a decision operation, thereby selecting the image corresponding to the cursor position. A selection frame 905 is displayed on the selected reduced image 907.

The Adjust button 902 provides a function of transferring RAW image data corresponding to the reduced image 907 selected in the list image display area 904 to a proper development processing apparatus 400 (development processing software) and adjusting the image quality of the RAW image data. A method of selecting the development processing apparatus 400 (development processing software) will be described later. The End button 903 is used to end the image management apparatus.

<Image Management Method According to Embodiment>

Figure 11A:
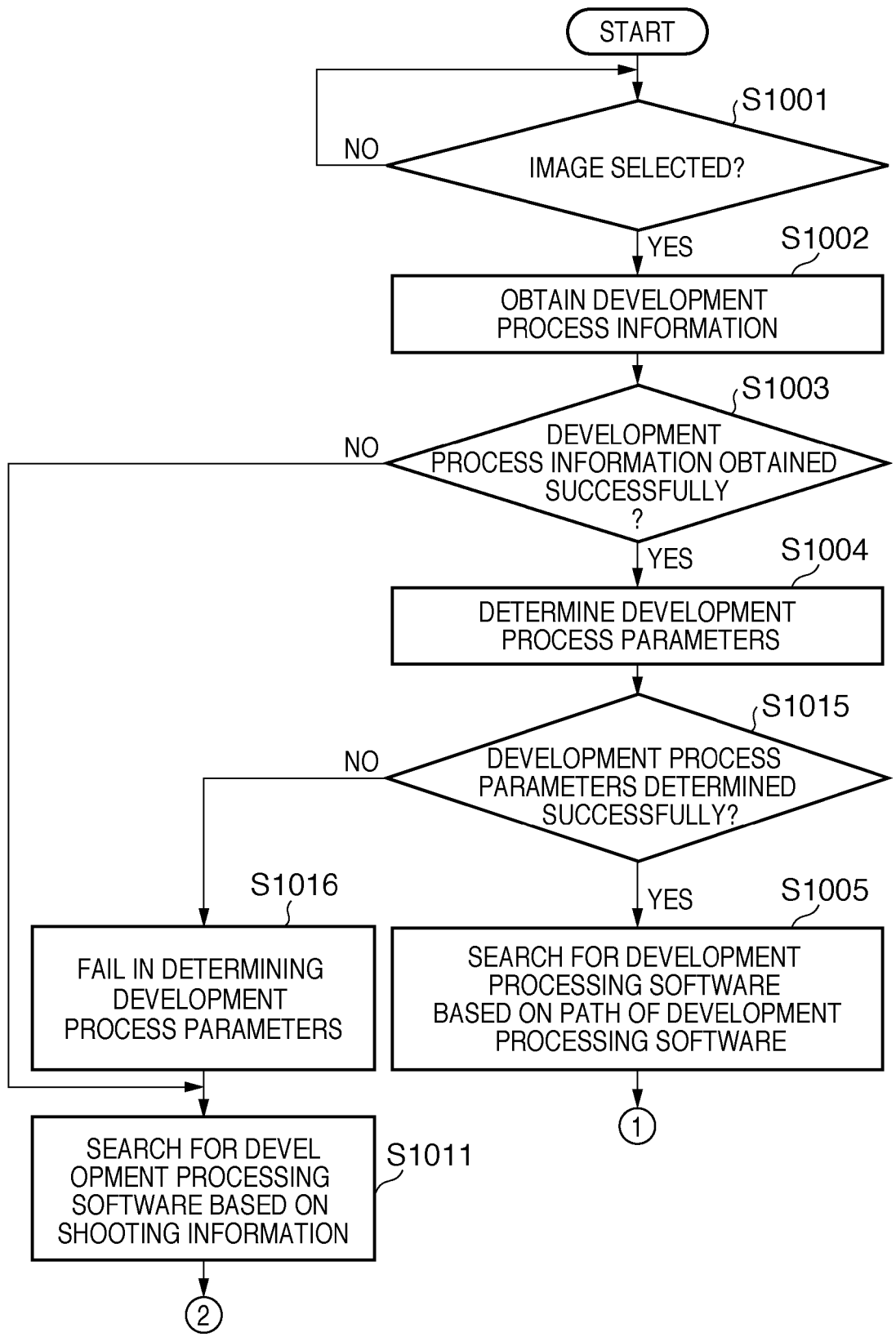
FIGS. 11A and 11B are flowcharts exemplifying an image management process according to the embodiment of the present invention.
Figure 11B:
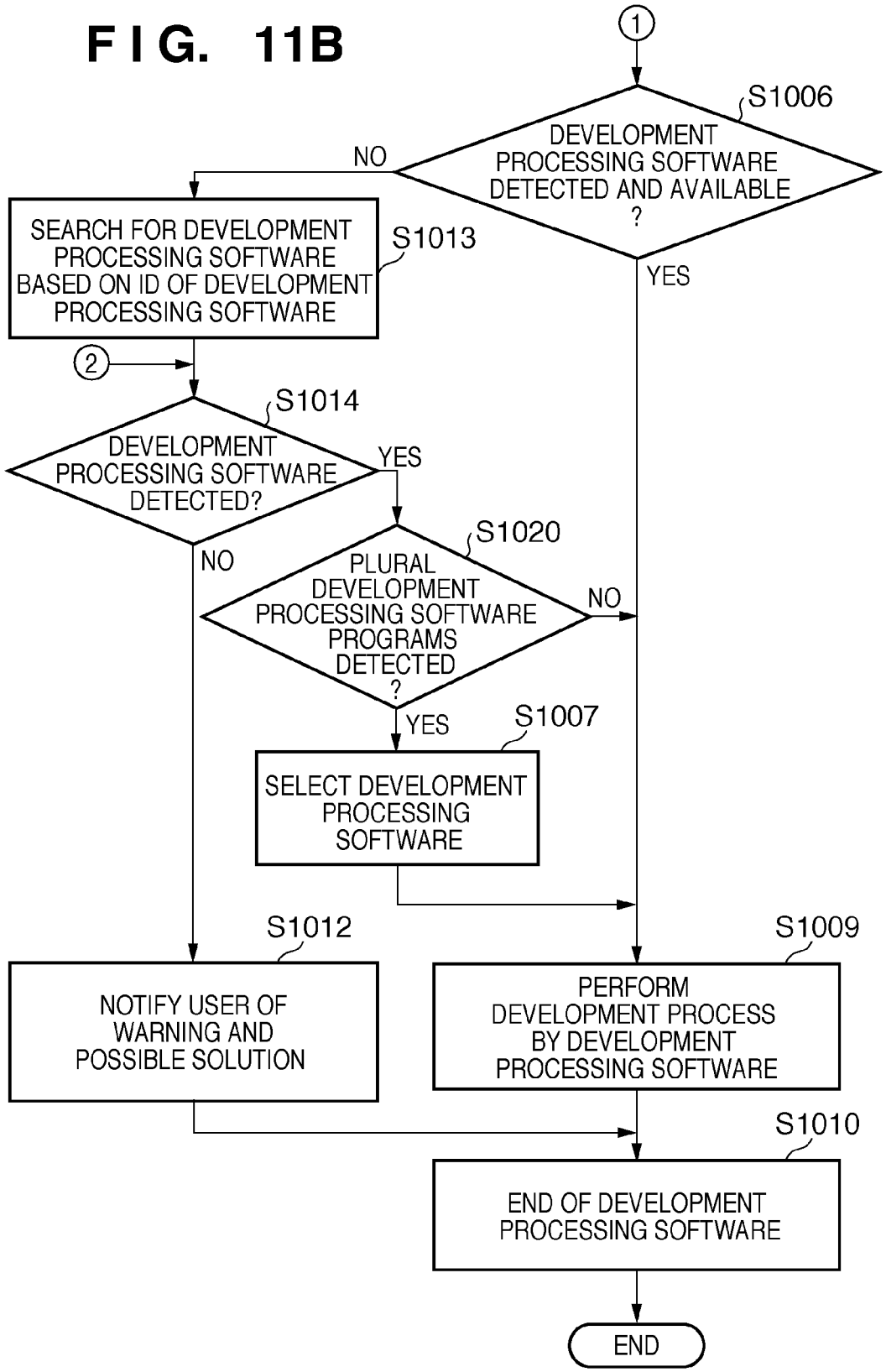

FIGS. 11A and 11B are flowcharts exemplifying an image management process according to the embodiment. An image management method according to the embodiment will be explained with reference to FIGS. 11A, 11B and FIG. 10 described above. The process of the flowchart in FIGS. 11A and 11B is executed when the CPU 401 executes a control program (image management software) stored in the RAM 403. The following description assumes the image management apparatus to be image management software.

Assume that the image management software is activated, and a plurality of image files 300 or 300A are loaded in response to the manipulation of the Load File button 901 before executing the flowchart of FIG. 11A. Also assume that the list image display area 904 displays the reduced images 907 corresponding to the loaded image file 300 or 300A.

In S1001, it is determined whether the user has selected an image to be processed from the reduced images 907 displayed in the list image display area 904. This determination is made based on whether the user has manipulated the Adjust button 902 while selecting one of the reduced images 907 displayed in the list image display area 904. In the example of FIG. 10, an image "IMG_001" displayed with the selection frame 905 is selected as an image to be processed.

If it is determined in S1001 that the user has not selected an image, the process returns to S1001 to wait for a user operation to select an image. If it is determined in S1001 that the user has selected an image, the process shifts to S1002.

In S1002, all pieces of development process information added to the image file 300 or 300A corresponding to the selected reduced image 907 are obtained. Details of the development process information obtaining method will be described later. In the following description, the "image file 300 or 300A corresponding to the selected reduced image 907" will be referred to as an "image file to be processed" or simply "image file" for descriptive convenience.

In S1003, it is determined whether the development process information has been obtained successfully in S1002. If it is determined that the development process information has been obtained successfully, the process shifts to S1004.

In S1004, the CPU 401 extracts development process parameter attribute information from each of all pieces of obtained development process information. The CPU 401 compares pieces of date and/or time information (prm_year, prm_month, prm_day, prm_hour, prm_minute, and prm_second) each indicating the date and/or time of creation or update described in each development process parameter attribute information. As a result of the comparison, the CPU 401 selects development process information having the latest date and/or time of creation or update. The CPU 401 determines development process parameters contained in the selected development process information as parameters used in a development process for RAW image data corresponding to the development process information.

This will be explained using concrete examples. Assume that three pieces of development process information are obtained in S1002 and have the first development process parameter attribute information, second one, and third one, respectively, as exemplified below.

An example of the first development process parameter attribute information is
prm_appID=9
prm_sizeofPrm=2000
prm_year=2001
prm_month=3
prm_day=4
prm_hour=10
prm_minute=2
prm_second=55
prm_appPcPhysicalAddress=02-03-0A-0B-0-C-01
prm_appPath=C:¥ProgramFiles¥App¥App_0004.exe
prm_appVer=1.0.0.2
prm_importance=5
prm_author=UserA
prm_viewer=UserB An example of the second development process parameter attribute information is
prm_appID=2
prm_sizeofPrm=3000
prm_year=2004
prm_month=10
prm_day=30
prm_hour=15
prm_minute=8
prm_second=42
prm_appPcPhysicalAddress=NULL
prm_appPath=http://server.co.jp/service/App_002
prm_appVer=1.1.0.5
prm_importance=5
prm_author=UserA
prm_viewer=UserB An example of the third development process parameter attribute information is
prm_appID=9
prm_sizeofPrm=5000
prm_year=2006
prm_month=9
prm_day=1
prm_hour=19
prm_minute=25
prm_second=11
prm_appPcPhysicalAddress=NULL
prm_appPath=http://server.co.jp/service/App_004
prm_appVer=1.2.0.8
prm_importance=5
prm_author=UserA
prm_viewer=UserB In the first development process parameter attribute information, the date and time of creation or update is 2001/3/4 10:02:55. In the second development process parameter attribute information, the date and time of creation or update is 2004/10/30 15:08:42. In the third development process parameter attribute information, the date and/or time of creation or update is 2006/9/1 19:25:11. The third development process parameter attribute information exhibits the latest date and time of creation or update. It is therefore determined to use development process parameters corresponding to the third development process parameter attribute information in a development process for RAW image data.

If only one development process information is obtained in S1002, development process parameters are uniquely determined without comparison.

In S1015, it is determined whether the development process parameters have been determined successfully in S1004. If it is determined that the development process parameters have been determined successfully, the process shifts to S1005.

In S1005, development processing software associated with the development process parameters is searched for based on the path prm_appPath contained in the development process parameter attribute information corresponding to the development process parameters determined in S1004. For example, the CPU 401 executes the search.

Based on the search result in S1005, it is determined in S1006 whether the development processing software is detected at a position indicated by the path prm_appPath and is available. Whether the development processing software is available can be determined based on, for example, the right of access to the development processing software or whether the development processing software is busy now. When the path indicates a network address, this determination can also be made based on whether an information processing apparatus (e.g., server apparatus) at the connection destination is active.

If it is determined that the development processing software is detected at a position indicated by the path prm_appPath and is available, the process shifts to S1009.

In S1009, the development processing software determined to be used in a development process is controlled to use the development process parameters determined in S1004 and perform a development process for RAW image data stored in the image file containing the development process parameters. The image file reproduction method and development processing method by the development processing software have been described with reference to FIG. 6.

More specifically, in S1009, the CPU 401 transfers (notifies), to the development processing software determined to be used in a development process, the image file to be processed or information capable of identifying it. For example, the development processing software gives an execution file a command to instruct execution using a file name as an argument. Then, the CPU 401 can transfer, to the development processing software, the image file or information which identifies it. An example of the command is C:¥ProgramFiles¥App¥App_0001.exe "C:¥Sample¥IMG_0001.RAW"

In this example, the CPU 401 transfers the image file path "C:¥Sample¥IMG_0001.RAW" as an argument to the development processing software indicated by the path prm_appPath=C:¥ProgramFiles¥App¥App_0001.exe.

Note that the first letter "C:" of the path prm_appPath means that the path prm_appPath is a path in a computer on which the image management software runs. More specifically, the development processing software path prm_appPath=C:¥ProgramFiles¥App¥App_0001.exe means that the development processing software runs on the same computer as that of the image management software. This also applies to the path of an image file.

By using a URL as the development processing software path prm_appPath, an image file or information which identifies it can be transferred to development processing software running on an external apparatus. For example, an image file or information which identifies it can be transferred to development processing software running on a server apparatus connected via a network to a computer on which the image management software runs. In this case, the development processing software in the server apparatus can execute a development process. An example of this command is http://server.co.jp/service/App_004 "C:¥ Sample ¥ IMG_0001.RAW"

In this example, the CPU 401 transfers the image file path "C:¥ Sample ¥ IMG_0001.RAW" as an argument to the development processing software indicated by the path prm_appPath=http://server.co.jp/service/App_004 described by a URL. In this case, the image file is transmitted via a network from the path "C:¥ Sample¥IMG_0001.RAW" to the URL "http://server.co.jp/service/App_004".

Also in S1009, the CPU 401 transfers (notifies) the development process parameters determined in S1004 to the development processing software determined to be used in a development process. The transferred information may be not the development process parameters themselves but information which identifies development process parameters determined in S1004, out of development process information added to the image file to be processed.

After the command which designates the RAW image data development processing method is transferred to the development processing software in S1009 in the above-described way, the process shifts to S1010, ending a series of processes by the image management software.

If it is determined in S1003 that obtainment of development process information has failed, the process shifts to S1011. It is determined that obtainment of development process information has failed when, for example, development process information is not added to the image file or cannot be obtained owing to any reason.

If it is determined in S1015 that determination of the development process parameters has failed, a message to this effect is displayed in S1016, and the process shifts to S1011. In S1016, for example, a warning "development process parameters cannot be determined. An image will be played back based on information upon image capturing." is displayed.

In S1011, development processing software is searched for based on information indicating the model of an image capturing apparatus in shooting information stored in the shooting information area 301 of the image file to be processed. For example, a development processing software list is referred to, which is a table that associates the model of an image capturing apparatus with development processing software corresponding to the target development processing software. The development processing software list is stored in, e.g., the hard disk 405, and used after read out to the image management software.

FIG. 12 exemplifies the structure of the development processing software list. In the example of FIG. 12, the development processing software list is made up of items "ID", "access method", "name", "compatible model", "development process time", "status", "wait time", and "communication time". The value of the item "ID" is associated with those of the remaining items. The development processing software list is not limited to these items and may have another item.

The item "ID" stores identification information for identifying development processing software, and corresponds to the identification information prm_appID of development process parameter attribute information. The item "access method" stores the path of development processing software, and corresponds to the path prm_appPath of development process parameter attribute information. The item "name" stores the name of development processing software. The item "compatible model" stores the model name of an image capturing apparatus compatible with development processing software. A value stored in the item "development process time" is, e.g., a time estimated to be necessary for a development process by development processing software for RAW image data having a predetermined size.

The items "ID", "access method", "name", "compatible model", and "development process time" are permanent information of development processing software and thus can be obtained in advance and registered in the development processing software list. The user may input data using the input device 407.

The item "status" stores the current status of development processing software. The development processing software status includes information indicating, for example, whether communication with the development processing software is possible, and whether the development processing software can perform a development process now for new RAW image data. The item "wait time" stores the time until the development processing software becomes able to start a development process. The item "communication time" is the time estimated to be required for communication (one or two ways) between image management software and development processing software.

If necessary, the items "status", "wait time", and "communication time" are rewritten at a predetermined timing, for example, in real time or at a predetermined interval. For example, the image management software can communicate with each development processing software registered in the development processing software list at a predetermined timing, and obtain values stored in the items "status", "wait time", and "communication time".

The development processing software list may not be stored in the hard disk 405 as long as the image management software can refer to it. For example, permanent information may be obtained from a server apparatus via a network by communication using the communication I/F 421. However, the obtaining method is not limited to this, and permanent information may be used by reading out, by the optical disk drive 406 or the like, the development processing software list recorded on a recording medium such as a CD-ROM or DVD-ROM.

The development processing software list may store only development processing software, the access method of which is known. FIG. 13 exemplifies the development processing software list in this case. In the example of FIG. 13, the development processing software list has only the items "ID", "access method", and "name". In this case, the image management software may communicate with development processing software based on the contents of "access method" to obtain information such as the status and performance from the development processing software, and update the development processing software list shown in FIG. 12 based on the obtained information.

When, for example, a network-connected external device executes development processing software, the status (connection/disconnection) and time of communication with the development processing software may change dynamically. Also, the function may be improved by updating development processing software or the number of compatible models may increase. From this, necessary information is obtained by communicating with development processing software using information stored in "access method", thereby coping with dynamic changes of the communication status and communication time, and an updated function or the like of the development processing software.

In the example of FIG. 12, development processing software having an "ID" of "007" can deal with an image "IMG_001" which was captured by an image capturing apparatus having a name "CameraD" and is selected as a process target. Also, development processing software having an "ID" of "001" and development processing software having an "ID" of "009" can deal with the image "IMG_001" captured by an image capturing apparatus having a name "CameraB".

Referring back to the flowchart of FIG. 11B, if it is determined in S1006 that the development processing software is neither detected at a position indicated by the path prm_appPath nor available, the process shifts to S1013 (FIG. 11B).

In S1013, development processing software matching the identification information prm_appID is searched for based on the identification information prm_appID in development process parameter attribute information corresponding to the development process parameters determined in S1004. After the search in S1013, the process shifts to S1014.

In S1013, development processing software is searched for by referring to the development processing software list explained with reference to FIG. 12, based on the identification information prm_appID. For example, compliant development processing software is searched for by referring to the development processing software list based on the identification information prm_appID=009 in the third development process parameter attribute information.

Development process parameters applicable to development processing software may change depending on the manufacturer, type, version, or the like of development processing software. In other words, the development process parameters determined in S1004 are not applicable to all kinds of development processing software. Hence, development processing software to which the development process parameters determined in S1004 are applicable need to be searched for, and the search process is done in S1013. This also applies to S1005 described above.

In S1014, it is determined based on the search result of S1013 or S1011 whether development processing software which meets the search condition has been detected.

If it is determined that development processing software which meets the search condition has not been detected, the process shifts to S1012, and the display device 420 displays a warning that no development processing software has been detected. At this time, it is more preferable to present information suggesting a possible solution (e.g., "please connect to a network to install the latest application") to the failure in detecting development processing software.

FIG. 14 exemplifies a warning displayed in S1012. In the example of FIG. 14, the name of development processing software associated with development process parameters, in other words, that of development processing software previously used in image quality adjustment is displayed. In addition, a warning message is displayed to represent that the development processing software cannot be detected. Further in this example, a message is displayed to prompt the user to acquire development processing software compatible with the development process parameters. After displaying the warning, the process shifts to S1010, ending a series of processes by the image management software.

If it is determined in S1014 that development processing software which meets the search condition has been detected, the process shifts to S1020 to determine whether a plurality of development processing software programs which meet the search condition have been detected. If it is determined that only one development processing software which meets the search condition has been detected, the process shifts to S1009 and the development processing software performs a development process.

If it is determined in S1020 that a plurality of development processing software programs which meet the search condition have been detected, the process shifts to S1007. In S1007, one of the development processing software programs which meet the search condition is selected.

In the embodiment, development processing software estimated to have the shortest time until output image data is obtained as a result of performing a development process for RAW image data is selected from the plurality of development processing software programs which meet the search condition. The estimated time sumTime necessary until output image data is obtained is calculated by $$\text{sumTime} = \text{waitTime} + \text{devTime} + \text{comTime} \quad (8)$$

Variables in equation (8) have the following meanings:
waitTime: wait time until a development process is executed
devTime: development process time necessary for a development process itself
comTime: communication time These variables in equation (8) are obtained by referring to the development processing software list in FIG. 12. That is, the wait time waitTime, development process time devTime, and communication time comTime are obtained by referring to the items "wait time", "communication time", and "development process time" in the list.

For each of the plurality of development processing software programs detected in S1014, the variables in equation (8) are obtained by referring to the development processing software list in FIG. 12, and the estimated time sumTime is calculated. The calculated estimated times sumTime of the respective development processing software programs are compared to detect the shortest estimated time sumTime. Development processing software corresponding to the detected estimated time sumTime is then selected. After selecting the development processing software, the process shifts to S1009 and the development processing software performs a development process.

In S1007 described above, the estimated time necessary until output image data is obtained is used as a selection criterion when selecting one of development processing software programs which meet the search condition. However, the selection criterion is not limited to this.

For example, information indicating the version of development processing software is usable as the criterion for selecting development processing software. The information indicating the version can be obtained from the version prm_appVer stored in development process parameter attribute information corresponding to development processing software. A case will be examined, in which a plurality of development processing software programs having the same name and different versions such as "1.0.0.5" and "1.2.0.3" have been detected. A larger value at a leftward digit in version information represents a newer version. In this case, development processing software of the version "1.2.0.3" is newer than that of the version "1.0.0.5" and is selected.

In S1007 described above, development processing software may be selected depending on, for example, whether an external device executes it. When development processing software is executed by an external device connected via a network to an information processing apparatus which executes the image management software, communication may be disconnected owing to any reason during transmission/reception of an image file or during a development process by the development processing software. For this reason, when identical development processing software is detected in both the information processing apparatus which executes the image management software and the network-connected external device, the development processing software in the information processing apparatus is selected.

In the above description, the process of searching for development processing software based on the identification information prm_appID in S1013 is performed when development processing software is searched for in S1005 based on the path prm_appPath but is not detected. However, the search process is not limited to this example, and the search process based on the path prm_appPath in S1005 and that based on the identification information prm_appID in S1013 may be replaced.

<Development Process Information Obtaining Method>

The method of obtaining development process information in S1002 of the flowchart in FIG. 12 will be explained with reference to the flowchart of FIG. 15. This development process information obtaining method is common as a whole to the development process information obtaining method in development processing software described with reference to FIG. 9. For brevity, the same reference numerals as those in the flowchart of FIG. 9 denote the same processes in FIG. 15, and a detailed description thereof will not be repeated.

Figure 15:
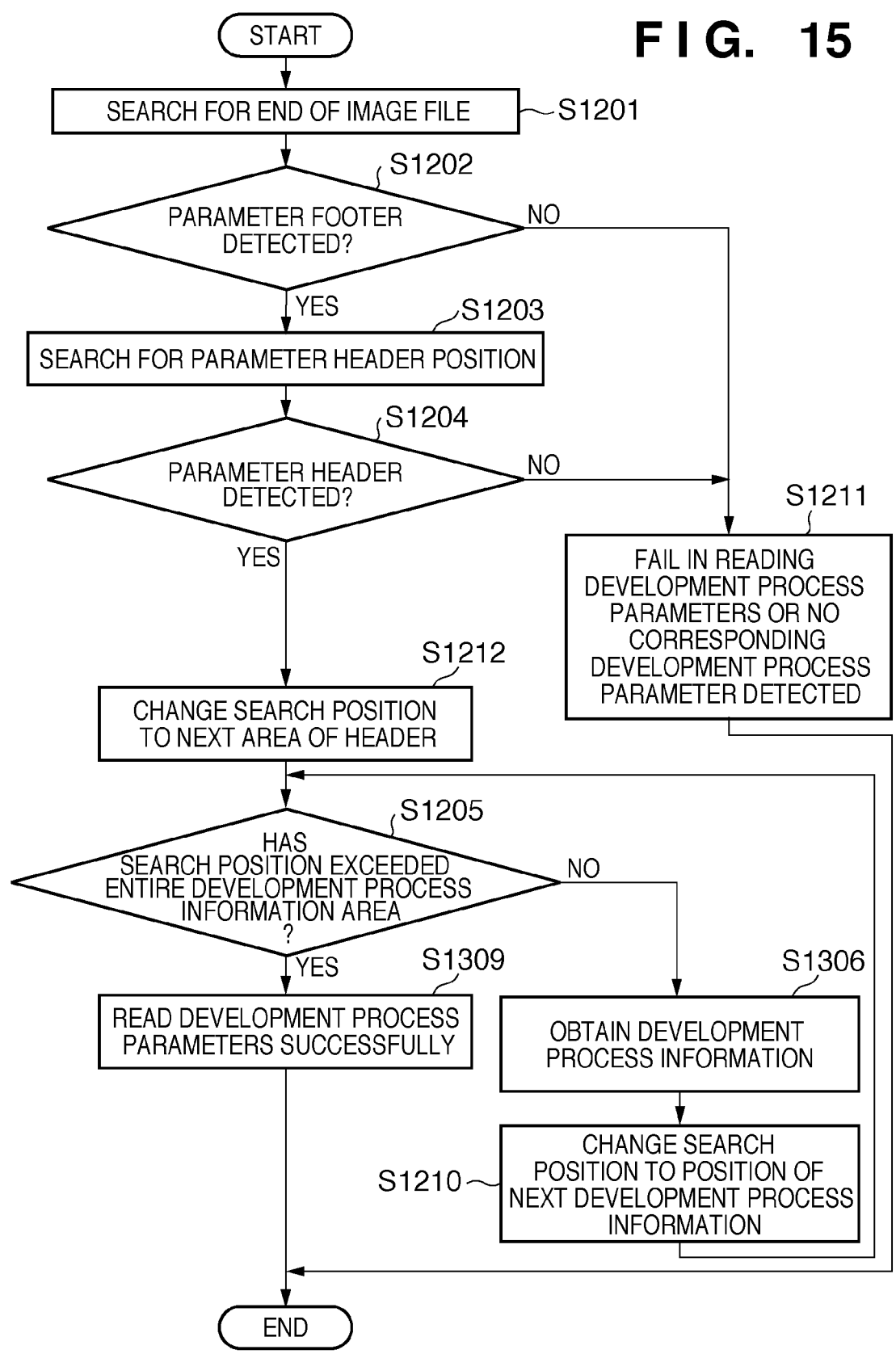
FIG. 15 is a flowchart exemplifying a method of obtaining development process information.

If an image file is selected in S1001 of FIG. 9, the process shifts to the flowchart of FIG. 15. In S1201, the end of the selected image file is searched for. It is determined whether the footer identifier and the total data size paramSizeSum have been detected as a result of the search in S1201 (S1202). If NO in S1202, the process shifts to S1211 to determine that reading of development process parameters has failed or there is no development process parameter. Then, a series of processes ends.

If it is determined in S1202 that the footer identifier and total data size paramSizeSum have been detected, the process shifts to S1203. In S1203, the search position changes to the start of the parameter header area 310 based on the total data size paramSizeSum detected in S1202. It is determined whether the header identifier has been detected (S1204). If it is determined that no header identifier has been detected, the process shifts to S1211, ending a series of processes.

If it is determined in S1204 that the header identifier has been detected, the process shifts to S1212. In S1212, the data size paramSizeOfHeader of the parameter header area 310 is obtained based on the position of the header identifier, and the search position changes to the next area of the parameter header area 310.

In S1205, it is determined whether the search position has exceeded the entire development process information area 311. If it is determined that the search position has exceeded the entire development process information area 311, the process shifts to S1309 to set a flag representing that that the development process parameter reading process is successful. The reading process then ends.

If it is determined in S1205 that the search position has not exceeded the entire development process information area 311, the process shifts to S1306. In S1306, the CPU 401 reads development process information from development process information area #n starting from the search position. The read development process information is held in the RAM 403 or hard disk 405 in association with the image file to be processed. Thereafter, the process shifts to S1210 to move the search position to the next development process information area #n+1. The process then returns to the determination process in S1205.

The processes in S1205, S1306, and S1210 are repeated until all pieces of development process information stored in the development process information area 311 are read. Each read development process information is held in association with the image file to be processed.

In the embodiment, an image file is formed by adding development process parameters and development process parameter attribute information to RAW image data. However, the image file is not limited to this example. More specifically, it suffices to associate development process parameters and development process parameter attribute information with RAW image data. The development process parameters and development process parameter attribute information need not always be stored in the same file as that of RAW image data. As long as the development process parameters and development process parameter attribute information are associated with RAW image data, these pieces of information can be obtained based on, for example, the association information.

As described above, according to the embodiment of the present invention, optimum development process parameters can be used when an author himself or another user plays back RAW image data after adjusting the image quality of RAW image data using arbitrary development processing software. This can prevent the neglect of development process parameters used in previous editing by the author.

Even if no optimum development processing software is detected when playing back RAW image data, its information can be obtained. Further, the name of development processing software previously used in editing can be attained.

According to the embodiment of the present invention, the image management software searches for development processing software based on identification information of the development processing software. This enables selecting appropriate development processing software even when playing back RAW image data in an information processing apparatus different from one which executed a development process for the RAW image data.

In the embodiment of the present invention, even if development processing software used to perform a development process is deleted from an information processing apparatus which executed the development process for RAW image data, the image management software searches for even development processing software executed by an external device. Proper development processing software can therefore be selected.

In the embodiment of the present invention, if a plurality of development processing software programs compatible with playback of RAW image data are detected, the image management software selects development processing software having the shortest time until output image data is obtained. The user can play back RAW image data quickly using appropriate development processing software.

Also in the embodiment of the present invention, if a plurality of development processing software programs compatible with playback of RAW image data are detected, the image management software can select development processing software of the latest version among them. In general, development processing software of a new version improves the image quality of output image data and the development processing function, compared to that of an old version. With development processing software of the latest version, the user can attain a higher-quality output image and achieve more sophisticated playback when playing back RAW image data.

In the embodiment of the present invention, if a plurality of development processing software programs compatible with playback of RAW image data are detected, the image management software can select operable development processing software. The user can avoid the risk of disconnection of communication when an external device executes a development process via communication.

<First Modification>

The first modification to the embodiment of the present invention will be explained. In the above-described embodiment, development process information having the latest date and/or time of creation or update is selected from pieces of development process information in S1004 of the flowchart in FIG. 11A, and development process parameters contained in the development processing software are selected.

To the contrary, in the first modification, development process parameters are determined using other kinds of development process parameter attribute information except for the date and/or time of creation or update, so that the user can play back RAW image data using development process parameters he wants. At this time, the user is allowed to set the priority order of other kinds of development process parameter attribute information. Development process parameters are selected based on development process parameter attribute information having the highest priority level.

Other kinds of development process parameter attribute information are, for example, "level of preference or importance", "author of development process parameters", and "viewer intended by the author of development process parameters".

Figure 16A:
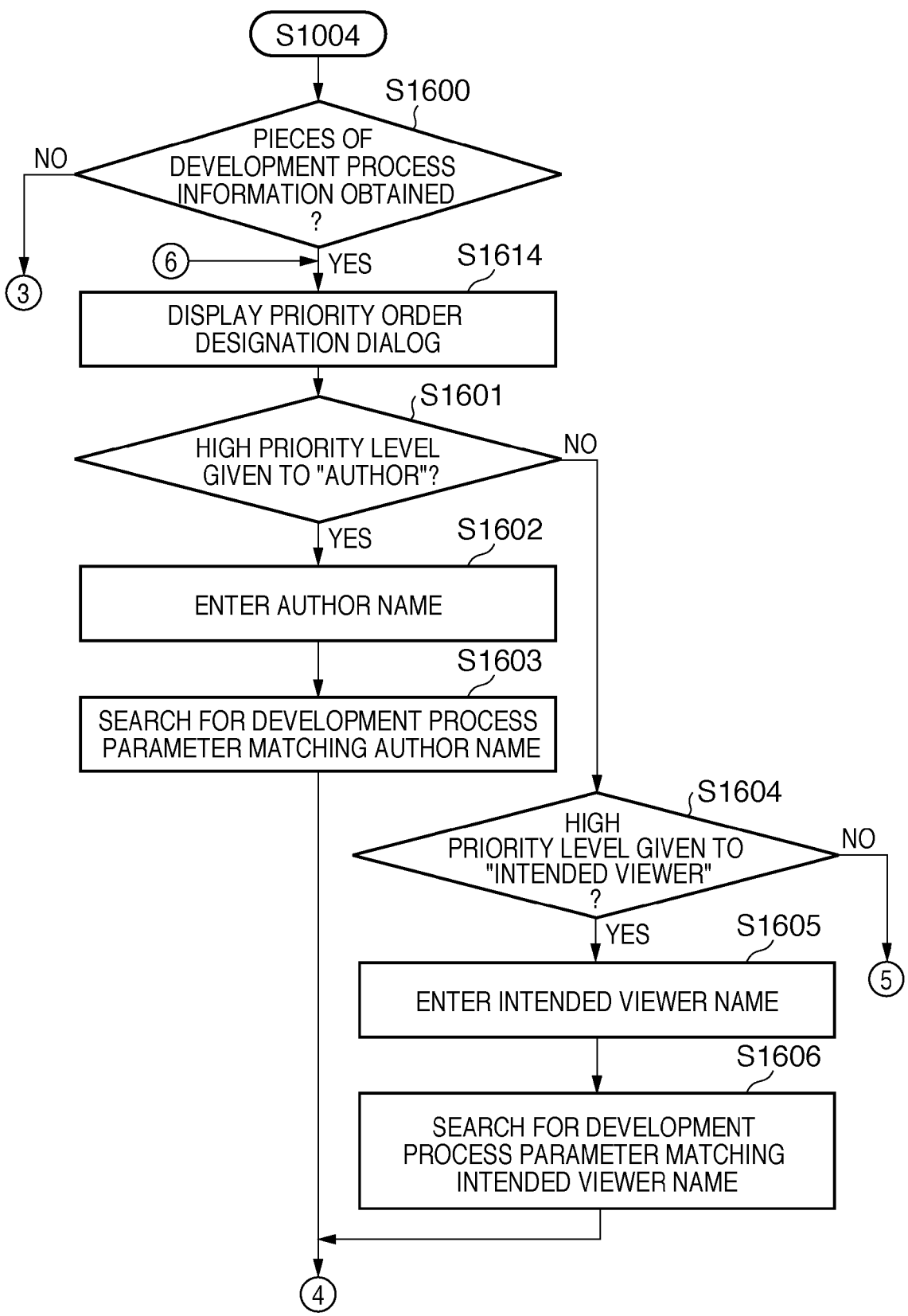
FIGS. 16A and 16B are flowcharts exemplifying a development process parameter determination process according to the first modification to the embodiment of the present invention.
Figure 16B:
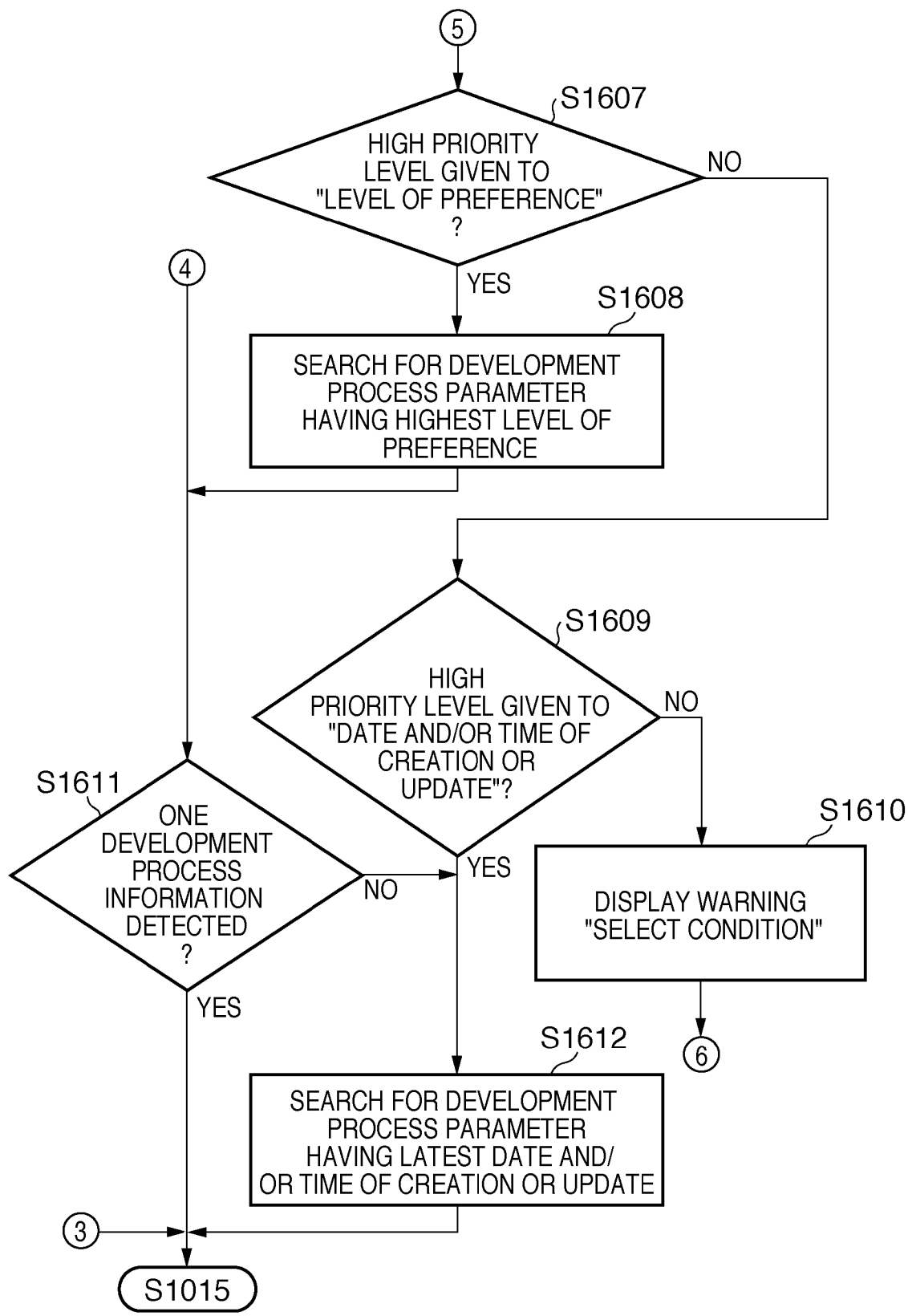

FIGS. 16A and 16B are flowcharts exemplifying a development process parameter determination process according to the first modification. The process in the flowcharts of FIGS. 16A and 16B corresponds to the process of S1004 in the foregoing flowchart of FIG. 11A.

If the development process information has been obtained successfully in S1003 of the flowchart in FIG. 11A, the process shifts to S1600 of the flowchart in FIG. 16A. In S1600, it is determined whether pieces of development process information have been obtained. If it is determined that one development process information has been obtained, the development process information determination process in FIGS. 16A and 16B ends, and the process shifts to S1004 of the flowchart in FIG. 11A. This is because when the number of pieces of development process information is one, development process parameters are determined uniquely.

If it is determined in S1600 that pieces of development process information have been obtained, the process shifts to S1614. In S1614, a dialog box appears to designate the priority order of other kinds of development process parameter attribute information. The dialog box prompts the user to select development process parameters for use in playback in the priority order.

FIG. 17 exemplifies a dialog box 700 provided by the user interface to designate the priority order of development process parameters. In the example of FIG. 17, the dialog box 700 presents four conditions to designate a priority order, and the user can select only one of the four conditions.

More specifically, an area 701 in the dialog box 700 displays a message which prompts the user to designate a priority order condition. An area 702 has radio buttons 703A to 703D for designating a priority order. The area 702 also displays the descriptions of priority orders designated with the radio buttons 703A to 703D. The radio buttons 703A to 703D are designed so that the user can select only one of selection items.

In the example of FIG. 17, the radio button 703A designates a priority order based on the value of the author prm_author who edited development process parameters. When the user selects the radio button 703A, high priority level is given to development process parameters corresponding to development process parameter attribute information containing the value of the author prm_author that coincides with a name entered by a process to be described later.

Similarly, the radio button 703B designates a priority order based on the value of the viewer prm_viewer intended by the author of development process parameters. When the user selects the radio button 703B, high priority level is given to development process parameters corresponding to development process parameter attribute information containing the value of the intended viewer prm_viewer that coincides with a name entered by a process to be described later.

The radio button 703C designates a priority order based on the level of preference prm_importance contained in development process parameter attribute information. For example, higher priority level is given to development process parameters corresponding to development process parameter attribute information containing a higher level of preference prm_importance.

The radio button 703D designates a priority order based on the date and/or time information (prm_year, prm_month, prm_day, prm_hour, prm_minute, and prm_second) of creation or update contained in development process parameter attribute information. For example, higher priority level is given to development process parameters corresponding to development process parameter attribute information containing a later date and/or time of creation or update.

When the user selects one of the radio buttons 703A to 703D and manipulates an OK button 704, the process shifts to S1601. In S1601, it is determined whether the user has selected the radio button 703A, i.e., designates a priority order based on the author prm_author. If it is determined that the user has selected the radio button 703A and designates a priority order based on the author prm_author, the process shifts to S1602.

In S1602, a dialog box for entering an author name, as exemplified in FIG. 18, appears and prompts the user to enter it. If the user enters an author name and manipulates the OK button, the input is completed and the process shifts to S1603. The entered author name is stored as author information in, e.g., the RAM 403.

In S1603, all pieces of development process information containing development process parameter attribute information having the value of the author prm_author that coincides with the author name entered in S1602 are searched for. After the end of the search, the process shifts to S1611 (FIG. 16B).

If it is determined in S1601 that the user has not selected the radio button 703A, i.e., does not designate a priority order based on the author prm_author, the process shifts to S1604. In S1604, it is determined whether the user has selected the radio button 703B, i.e., designates a priority order based on the intended viewer prm_viewer. If it is determined that the user has selected the radio button 703B and designates a priority order based on the intended viewer prm_viewer, the process shifts to S1605.

In S1605, a dialog box for entering an intended viewer name, as exemplified in FIG. 19, appears and prompts the user to enter it. If the user enters an intended viewer name and manipulates the OK button, the input is completed and the process shifts to S1606. The entered intended viewer name is stored as intended viewer information in, e.g., the RAM 403.

Note that the user can skip input of an intended viewer in S1605. In this case, the current user may be automatically set as an intended viewer based on, for example, account information of the image management software or an information processing apparatus on which image management software runs.

In S1606, all pieces of development process information containing development process parameter attribute information having the intended viewer prm_viewer that coincides with the intended viewer name entered in S1605 are searched for. After the end of the search, the process shifts to S1611.

If it is determined in S1604 that the user has not selected the radio button 703B, i.e., does not designate a priority order based on the intended viewer prm_viewer, the process shifts to S1607 (FIG. 16B). In S1607, it is determined whether the user has selected the radio button 703C, i.e., designates a priority order based on the level of preference prm_importance. If it is determined that the user has selected the radio button 703C and designates a priority order based on the level of preference prm_importance, the process shifts to S1608.

In S1608, all pieces of development process information containing development process parameter attribute information having the highest level of preference prm_importance. After the end of the search, the process shifts to S1611.

In S1611, it is determined whether only one development process information containing development process parameter attribute information which meets the search condition has been detected in S1603, S1606, or S1608. If it is determined that only one development process information has been detected, development process parameters contained in the development process information detected in S1603, S1606, or S1608 are determined as those used in a development process for RAW image data. The process then shifts to S1015 in FIG. 11A.

If development process information containing development process parameter attribute information which meets the search condition has not been detected in S1611, or it is determined that pieces of development process information have been detected, the process shifts to S1612.

If it is determined in S1607 that the user has not selected the radio button 703C, i.e., does not designate a priority order based on the level of preference prm_importance, the process shifts to S1609. In S1609, it is determined whether to designate a priority order based on whether the user has selected the radio button 703D. That is, it is determined whether to designate a priority order based on date and/or time information (prm_year, prm_month, prm_day, prm_hour, prm_minute, and prm_second) indicating the date and/or time of creation or update. If it is determined that the user has selected the radio button 703D and designates a priority order based on the date and/or time of creation or update, the process shifts to S1612.

In S1612, development process information containing development process parameter attribute information having the latest date and/or time of creation or update is searched for. Development process parameters contained in the detected development process information are determined as those used in a development process for RAW image data. After that, the process shifts to S1015 in FIG. 11A.

If it is determined in S1609 that the user has not selected the radio button 703D, i.e., does not designate a priority order based on the date and/or time of creation or update, he has not entered the designation of a priority order in S1614. In this case, the process shifts to S1610 to display a warning such as "select a condition." The process then returns to S1614 to prompt the user again to designate a priority order.

In this description, only a condition having the highest priority level is selected, but the priority order is not limited to this example. For example, priority levels can be sequentially assigned to a plurality of conditions. For example, a dialog box 800 as exemplified in FIG. 20 is prepared. The user selects one of conditions displayed in an area 801 by, for example, clicking the right button of a mouse, and changes the order of the selected condition with up and down arrow buttons 802. By manipulating an OK button 803, the user designates the priority order of the conditions in accordance with the arrangement order of the conditions in the area 801.

At this time, if the user designates the first to fourth priority levels, the search is done based on not the date and/or time of creation or update but a condition having the second priority level in the process of S1612. If pieces of development process information are detected, the search is done under a condition having the third priority level. This process is repeated to determine one development process parameter.

According to the first modification, the priority order is designated in S1614 only when it is determined in S1600 that pieces of development process information are detected. For an image file which has only one development process information and can uniquely determine development process parameters, the priority order need not be designated.

The designated priority order may be stored in a storage medium such as the hard disk 405 until, for example, the settings of the image management software are initialized. This obviates the need to designate a priority order again until the settings of image management software are initialized, increasing the efficiency of user work.

As described above, according to the modification of the present invention, RAW image data can be played back based on development process parameters the user wants.

As a concrete example, when the author of development process parameters wants to play back RAW image data based on the result of the latest image adjustment executed by himself, he designates an author name as a priority order condition. Then, development processing software is automatically searched for based on the latest development process parameters among those which satisfy the condition of the author name. The development processing software can play back RAW image data using the latest development process parameters.

As another example, a case will be examined, in which an author (called user A) who adjusted the image quality of RAW image data sends an image file to a user (called user B) whom user A wants to view an output image by playing back the RAW image data. In this case, user A designates the name of user B as the intended viewer prm_viewer in development process parameter attribute information. Upon receiving the image file, user B designates an intended viewer name as a priority order condition, and enters his name to the dialog box of FIG. 19. In response to this, development process software is automatically searched for based on the latest development process parameters among those which satisfy the condition of the intended viewer name. User B plays back RAW image data using the detected development processing software. Accordingly, RAW image data can be played back using the latest development process parameters by the development processing software detected based on the latest development process parameters user A wants user B to use.

As still another example, when the author of development process parameters wants to play back RAW image data with the result of image quality adjustment he likes the best, he designates the level of preference as a priority order condition. By using development process parameters the author likes the best (or considers to be the most important), RAW image data can be played back by development processing software detected based on the development process parameters.

By designating the priority level of each condition, as described with reference to FIG. 20, development process parameters used to play back RAW image data are determined in consideration of a plurality of conditions. Based on the determined development process parameters, development processing software is automatically searched for. The detected development processing software can play back RAW image data using the development process parameters.

If development process parameter attribute information does not contain an item which satisfies the condition, development process parameter attribute information is searched for under another condition. For example, when development process parameter attribute information does not contain an author name, it is determined in S1611 that development process parameter attribute information coincident with the author name has not been detected. In S1612, therefore, development process parameter attribute information is searched for based on the date and/or time of creation or update.

It is considered that the date and/or time of creation or update containing the second prm_second can minimize the possibility at which pieces of development process parameter attribute information overlap each other. Hence, one development process parameter can be determined by comparing all the conditions, i.e., year, month, day, hour, minute, and second of the date and/or time of creation or update. If all the conditions which form the date and/or time of creation or update overlap each other, one development process parameter is selected on the assumption that the same development process parameter is associated with pieces of development process parameter attribute information.

<Second Modification>

The second modification to the embodiment of the present invention will be explained. In the above-described embodiment, development processing software estimated to have the shortest time until output image data is obtained as a result of performing a development process for RAW image data is selected in S1007 of FIG. 11B. In contrast, in the second modification, the priority order is set based on the properties of development processing software, and matching development processing software is presented to the user.

FIG. 21 exemplifies a dialog box 2100 which forms a user interface according to the second modification. In the second modification, the user sets a priority order using the dialog box 2100, based on the properties of development processing software, and matching development processing software is presented to the user.

In the dialog box 2100, a message to the user is displayed in an upper area 2110. A property list 2111 is arranged below the area 2110, and an OK button 2105 is arranged below the property list 2111.

The property list 2111 represents the correspondence between the name and properties of development processing software in the row direction (lateral direction). In the example of FIG. 21, the version, operation device, and estimated output time of development processing software are defined as the properties of the development processing software. The operation device is information indicating a device on which the development processing software runs. The estimated output time is an estimated time until the development processing software outputs output image data after performing a development process for RAW image data.

In the property list 2111, for example, development processing software programs having the same name and different items are handled as different development processing software programs. In the example of FIG. 21, development processing software programs having versions "1.1.0.9" and "6.0.0.8" under the name of "AAA" are displayed as different development processing software programs. This also applies to different development processing software programs which have the same name but run on different operation devices.

Similar to the development processing software list described with reference to FIG. 12, data of the property list 2111 is created in advance, stored in, e.g., the hard disk 405, and read out for use by the image management software.

A table may be prepared, including the items of the development processing software list in the foregoing embodiment and the items of the property list 2111. For example, upon activation, the image management software tries to access each path described in the item of the "access method" in this table, obtaining information on available development processing software. The image management software generates information of the property list 2111 for development processing software determined to be available. The development processing software list can also be generated similarly in the above-described embodiment.

In FIG. 21, a frame 2109 is a selection frame representing a state in which development processing software is selected. The user selects development processing software by directly designating the name of the development processing software with a pointing device such as a mouse or moving the frame 2109 with the up and down arrow buttons of the keyboard.

In the property list 2111, outline and black inverted triangles arranged on the right side of item names are sort buttons for sorting lines based on values stored in corresponding items. In FIG. 21, a black inverted triangle indicates a sort button manipulated finally.

A sort button 2106 is a version number sort button for changing the display order in descending order of the version number. It is determined that a larger value at a leftward digit in the version number represents a newer version. When the user manipulates the sort button 2106, lines are entirely rearranged so that a newer version comes up. That is, the respective items are rearranged in synchronism with each other not to change the correspondence between the name and properties of each development processing software even after rearranging the items.

A sort button 2107 is an operation device sort button for changing the display order in ascending order of the possibility at which communication is disconnected in the operation device. The possibility of disconnection of communication in the operation device is considered to depend on the configuration of the operation device and a communication method between the image management software and its operation device. In this example, it is determined that the possibility of disconnection of communication increases in order of an information processing apparatus which executes the image management software, a camera, and a server. Lines are entirely rearranged in response to the manipulation of the sort button 2107 so that a device having a lower possibility of disconnection of communication comes up.

A sort button 2108 is an estimated output time sort button for changing the display order in ascending order of the estimated output time. When the user manipulates the sort button 2108, lines are entirely rearranged so that a shorter estimated output time comes up.

The sort buttons 2106, 2107, and 2108 are controlled exclusively. For example, when the user manipulates the sort button 2106 while the sort button 2108 has been manipulated (represented by the black inverted triangle), as shown in FIG. 21, the sort button 2106 changes to the manipulated state and the manipulated state of the sort button 2108 is canceled. At the same time, the list is sorted based on an item (version number) corresponding to the sort button 2106.

The OK button 2105 is used to finalize determination of selected development processing software. When the user manipulates the OK button 2105, the selection of development processing software surrounded by the frame 2109 is finalized.

As described above, according to the second modification of the present invention, the user can select development processing software he wants, while grasping the properties of matching development processing software. Further, the user can efficiently select development processing software he wants by changing the display order of the list based on a condition he wants.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-052553, filed on Mar. 5, 2009, which is hereby incorporated by reference herein its entirety.

What is claimed is:

1. An image management apparatus comprising:
    an obtaining unit configured to obtain RAW image data and attribute information relating to each of a plurality of development process parameter sets recorded in association with the RAW image data;
    a selection unit configured to select, based on the attribute information obtained by said obtaining unit, a development process parameter set to be used in a development process for the RAW image data among the plurality of development process parameter sets recorded in association with the RAW image data;
    a search unit configured to search, based on information which is contained in the attribute information for the development process parameter set selected by the selection unit and which can identify a developing unit capable of handling the development process parameter set selected by the selection unit, for a developing unit which is to perform a development process for the RAW image data; and
    a notifying unit configured to notify the developing unit found as a result of the search by said search unit of the development process parameter set selected by the selection unit and the RAW image data.

2. The apparatus according to claim 1, further comprising a table which holds identification information for identifying a developing unit and a method of access to the identified developing unit in association with each other,
    wherein the information which is contained in the attribute information for the development process parameter set selected by the selection unit and which can identify a developing unit capable of handling the development process parameter set selected by the selection unit, is identification information, wherein said search unit searches for the developing unit which is to perform the development process by looking up the table using the identification information contained in the attribute information for the development process parameter set selected by the selection unit, and said notifying unit makes the notification according to the method of access associated with the searched developing unit in the table.

3. The apparatus according to claim 1, further comprising a table which holds identification information for identifying a developing unit and a method of access to the identified developing unit in association with each other, wherein the information which is contained in the attribute information for the development process parameter set selected by the selection unit and which can identify a developing unit capable of handling the development process parameter set selected by the selection unit, is a method of access, wherein said search unit searches for a developing unit which is to perform the development process by looking up the table based on the method of access contained in the attribute information for the development process parameter set selected by the selection unit, and said notifying unit makes the notification according to the method of access contained in the attribute information for the development process parameter set selected by the selection unit.

4. The apparatus according to claim 1, wherein the attribute information includes at least one of date information indicating a date or time information indicating a time when the development process parameter set corresponding to the attribute information was created or updated, and said selection unit selects the development process parameter set based on at least one of the date information or the time information included in the attribute information.

5. The apparatus according to claim 1, wherein the attribute information includes author information indicating an author who created or updated the development process parameter set corresponding to the attribute information, and said selection unit selects the development process parameter set based on the author information included in the attribute information.

6. The apparatus according to claim 5, further comprising an input unit configured to input the author information, wherein said selection unit selects the development process parameter set corresponding to the attribute information including author information which matches the author information input to said input unit.

7. The apparatus according to claim 1, wherein the attribute information includes intended viewer information indicating an intended viewer of a result of performing the development process using a corresponding development process parameter set on the RAW image data, and said selection unit selects the development process parameter set based on the intended viewer information included in the attribute information.

8. The apparatus according to claim 7, further comprising an input unit configured to input the intended viewer information, wherein said selection unit selects the development process parameter set corresponding to the attribute information including intended viewer information which matches the intended viewer information input to said input unit.

9. The apparatus according to claim 1, wherein the attribute information includes information indicating a level of preference by an author for a result of performing a development process by the author using a corresponding development process parameter set on the RAW image, and said selection unit selects the development process parameter set based on information which is included in the attribute information and indicates a level of preference.

10. The apparatus according to claim 1, further comprising a setting unit configured to set a priority order for pieces of information included in the attribute information, wherein said selection unit selects said development process parameter set based on the priority order of the pieces of information.

11. The apparatus according to claim 1, further comprising a developing unit selection unit configured to select one developing unit to be perform the development process from among a plurality of developing units when the result of the search by said search unit finds the plurality of developing units, wherein said developing unit selection unit selects said one developing unit based on a property of said developing unit.

12. The apparatus according to claim 11, wherein the property includes at least one of a version of the developing unit, whether an external device has the developing unit, and an estimated output time estimated to be necessary to obtain an output image by performing the development process by the developing unit for the RAW image data using the selected development process parameter set.

13. An image management method executed by an image management apparatus, comprising:

an obtaining step of obtaining RAW image data and attribute information relating to each of a plurality of development process parameter sets recorded in association with the RAW image data;

a selection step of selecting, based on the attribute information obtained by the obtaining step, a development process parameter set to be used in a development process for RAW image data among the plurality of development process parameter sets recorded in association with the RAW image data;

a search step of searching, based on the information which is contained in the attribute information for the development process parameter set selected by the selection step and which can identify developing unit capable of handling the development process parameter set selected by the selection step, for a developing unit which is to perform a development process for the RAW image data; and a notifying step of notifying the developing unit found as a result of the search in the search step of the development process parameter set selected by the selection step and the RAW image data.

14. A non-transitory computer-readable storage medium storing computer executable code of a program for causing a computer to function as an image management apparatus, the program comprising:

code of an obtaining step of obtaining RAW image data and attribute information relating to each of a plurality of development process parameter sets recorded in association with the RAW image data;

code of a selection step of selecting, based on the attribute information obtained by the obtaining step, a development process parameter set to be used in a development process for RAW image data among the plurality of development process parameter sets recorded in association with the RAW image data;

code of a search step of searching, based on the information which is contained in the attribute information for the development process parameter set selected by the selection step and which can identify developing unit capable of handling the development process parameter set selected by the selection step, for a developing unit which is to perform a development process for the RAW image data; and code a notifying step of notifying the developing unit found as a result of the search in the search step of the development process parameter set selected by the selection step and the RAW image data.

15. The apparatus according to claim 1, further comprising a communication interface configured to be used to communicate with an external device, wherein said notifying unit notifies the developing unit found by said search unit, and which is included in an external device, of the development process parameter set selected by the selection unit and the RAW image data, using the communication interface if the developing unit found by said search unit resides in the external device.

16. An image management apparatus comprising:

a memory storing computer executable code of a computer program; and a processor for executing the code stored in the memory, wherein, when executed by the processor, the code causes the image management apparatus to execute:

obtaining RAW image data and attribute information relating to each of a plurality of development process parameter sets recorded in association with the RAW image data;

selecting, based on the attribute information obtained by said obtaining step, a development process parameter set to be used in a development process for the RAW image data among the plurality of development process parameter sets recorded in association with the RAW image data;

searching, based on information which is contained in the attribute information for the development process parameter set selected by the selecting step and which can identify a developing unit capable of handling the development process parameter set selected by the selecting step, for a developing unit which is to perform a development process for the RAW image data; and notifying the developing unit found as a result of the search by said searching step of the development process parameter set selected by the selecting step and the RAW image data.

17. The apparatus according to claim 16, further comprising a table which holds identification information for identifying a developing unit and a method of access to the identified developing unit in association with each other, wherein the information which is contained in the attribute information for the development process parameter set selected by the selecting step and which can identify a developing unit capable of handling the development process parameter set selected by the selecting step, is identification information, wherein said searching step searches for the developing unit which is to perform the development process by looking up the table using the identification information contained in the attribute information for the development process parameter set selected by the selecting step, and said notifying step makes the notification according to the method of access associated with the searched developing unit in the table.

18. The apparatus according to claim 16, further comprising a table which holds identification information for identifying a developing unit and a method of access to the identified developing unit in association with each other, wherein the information which is contained in the attribute information for the development process parameter set selected by the selecting step and which can identify a developing unit capable of handling the development process parameter set selected by the selecting step, is a method of access, wherein said searching step searches for a developing unit which is to perform the development process by looking up the table based on the method of access contained in the attribute information for the development process parameter set selected by the selecting step, and said notifying step makes the notification according to the method of access contained in the attribute information for the development process parameter set selected by the selecting step.

19. The apparatus according to claim 16, wherein the attribute information includes at least one of date information indicating a date or time information indicating a time when the development process parameter set corresponding to the attribute information was created or updated, and said selecting step selects the development process parameter set based on at least one of the date information or the time information included in the attribute information.

20. The apparatus according to claim 16, wherein the attribute information includes author information indicating an author who created or updated the development process parameter set corresponding to the attribute information, and said selecting step selects the development process parameter set based on the author information included in the attribute information.

21. The apparatus according to claim 20, further comprising inputting via an input unit the author information, wherein said selecting step selects the development process parameter set corresponding to the attribute information including author information which matches the author information input to said input unit.

22. The apparatus according to claim 16, wherein the attribute information includes intended viewer information indicating an intended viewer of a result of performing the development process using a corresponding development process parameter set on the RAW image data, and said selecting step selects the development process parameter set based on the intended viewer information included in the attribute information.

23. The apparatus according to claim 22, further comprising inputting via an input unit the intended viewer information, wherein said selecting step selects the development process parameter set corresponding to the attribute information including intended viewer information which matches the intended viewer information input to said input unit.

24. The apparatus according to claim 16, wherein
the attribute information includes information indicating a level of preference by an author for a result of performing a development process by the author using a corresponding development process parameter set on the RAW image, and
said selecting step selects the development process parameter set based on information which is included in the attribute information and indicates a level of preference.

25. The apparatus according to claim 16, further comprising setting a priority order for pieces of information included in the attribute information,
wherein said selecting step selects said development process parameter set based on the priority order of the pieces of information.

26. The apparatus according to claim 16, further comprising a developing unit selection step of selecting one developing unit to be perform the development process from among a plurality of developing units when the result of the search by said searching step finds the plurality of developing units, wherein said developing unit selection step selects said one developing unit based on a property of said developing unit.

27. The apparatus according to claim 26, wherein the property includes at least one of a version of the developing unit, whether an external device has the developing unit, and an estimated output time estimated to be necessary to obtain an output image by performing the development process by the developing unit for the RAW image data using the selected development process parameter set.

28. The apparatus according to claim 16, further comprising a communication interface configured to be used to communicate with an external device,
wherein said notifying step notifies the developing unit found by said searching step, and which is included in an external device, of the development process parameter set selected by the selecting step and the RAW image data, using the communication interface if the developing unit found by said searching step resides in the external device.

* * * * *